United States Patent
Nakatsugawa

(10) Patent No.: US 9,781,023 B2
(45) Date of Patent: Oct. 3, 2017

(54) INFORMATION PROCESSING DEVICE, INFORMATION PROCESSING METHOD, AND RECORDING MEDIUM

(71) Applicant: FUJITSU LIMITED, Kawasaki (JP)

(72) Inventor: Keiichi Nakatsugawa, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 488 days.

(21) Appl. No.: 13/972,188

(22) Filed: Aug. 21, 2013

(65) Prior Publication Data

US 2014/0181297 A1  Jun. 26, 2014

(30) Foreign Application Priority Data

Dec. 26, 2012 (JP) ................................ 2012-282987

(51) Int. Cl.
H04L 12/26 (2006.01)
H04L 29/08 (2006.01)
H04L 29/14 (2006.01)

(52) U.S. Cl.
CPC ...... H04L 43/0876 (2013.01); H04L 67/1097 (2013.01); H04L 43/16 (2013.01); H04L 67/101 (2013.01); H04L 69/40 (2013.01)

(58) Field of Classification Search
CPC ..... H04L 47/10; H04L 47/19; H04L 41/5054; H04L 47/24; H04L 65/1013;

(Continued)

(56) References Cited

U.S. PATENT DOCUMENTS 7,746,789 B2 * 6/2010 Katoh ................... H04L 41/147
                                                        370/235
7,945,655 B2 * 5/2011 Lisiecki .............. G06F 17/3089
                                                        709/203

(Continued)

FOREIGN PATENT DOCUMENTS

JP  2000-242609  9/2000
JP  2004-126716  4/2004

(Continued)

OTHER PUBLICATIONS

Tei et al., "A Node Selection Metric for Energy Efficient In-network Processing", Information Processing Society of Japan, Vo. 49, No. 6, Jun. 2008, pp. 1872-pp. 1884.

(Continued)

*Primary Examiner* — Kevin Bates
*Assistant Examiner* — Ranjun Pant
(74) *Attorney, Agent, or Firm* — Staas & Halsey LLP

(57) ABSTRACT

An information processing device includes a memory configured to store information related to data accesses by executions of a plurality of applications, and a network configuration of a network system including a plurality of communication devices and a plurality of processing devices each of which executes any one of the plurality of applications, and a processor configured to calculate traffic amounts, when each of the plurality of communication devices is assumed as a data storage location to store data to be accessed by the executions, to be generated in the network system by the executions, based on the information and the network configuration, and determine a communication device to store the data to be accessed by the executions based on the calculated traffic amounts, among the plurality of communication devices.

11 Claims, 38 Drawing Sheets

(58) Field of Classification Search
CPC ............. H04L 65/1036; H04L 65/4084; H04L 67/2852; H04L 67/288; H04L 67/2842; H04L 67/289; H04L 65/60; H04L 41/12; H04L 43/08; H04L 65/4069; H04L 12/1489; H04L 41/0896; H04L 45/00; H04L 47/12; H04L 2029/06054; H04L 67/1002; H04L 67/1008; H04L 67/101; H04L 29/12811; H04L 61/6009; H04L 45/14; H04L 63/1408; H04L 67/104; H04L 67/1012; H04L 67/1095; H04L 41/083; H04L 41/147; H04L 41/5035; H04L 43/0882; H04L 43/0888; H04L 43/0894; H04L 45/126; G06F 17/30902; G06F 17/30554; G06F 11/1464; G06F 11/3495; G06F 12/0875; G06F 17/30132; G06F 17/30516; G06F 17/30893; G06F 17/30215; G06F 17/3089; G06F 3/0613; G06F 3/065

See application file for complete search history.

(56) References Cited

U.S. PATENT DOCUMENTS

| | | | | |
|---|---|---|---|---|
| 8,447,842 B2* | 5/2013 | Lisiecki | ............. | G06F 17/3089 709/203 |
| 8,626,910 B1* | 1/2014 | Lientz | ................ | H04L 41/0896 702/186 |
| 2004/0064633 A1* | 4/2004 | Oota | ..................... | G06F 3/0613 711/100 |
| 2004/0218529 A1* | 11/2004 | Rodosek | ............. | H04L 41/0213 370/235 |
| 2011/0258257 A1* | 10/2011 | Previdi | ................. | H04L 45/126 709/205 |
| 2013/0047270 A1* | 2/2013 | Lowery | ............... | H04L 43/0852 726/29 |
| 2013/0054756 A1* | 2/2013 | Do | ................... | H04N 21/23103 709/219 |
| 2013/0212300 A1* | 8/2013 | Eggleston | .......... | H04L 61/1511 709/245 |

FOREIGN PATENT DOCUMENTS

| | | | | |
|---|---|---|---|---|
| JP | 2011-209900 | | 10/2011 | |
| WO | 2012/073406 A1 | | 6/2012 | |
| WO | WO 2012/073406 A1 * | | 7/2012 | ............. H04L 12/56 |

OTHER PUBLICATIONS

Japanese Office Action dated Jun. 28, 2016 in corresponding Japanese Patent Application No. 2012-282987.

* cited by examiner

FIG. 4

| APPLICATION | READ PROPERTY | | | EDGE COMMUNICATIONS DEVICE |
|---|---|---|---|---|
| | DATA TYPE | AVERAGE READS PER SECOND | AVERAGE DATA SIZE PER READ | |
| B11 | D1 | 0.1 | 100 KBYTES | A1 |
| B12 | D1 | 0.1 | 100 KBYTES | A1 |
| B21 | D1 | 0.1 | 100 KBYTES | A2 |
| B31 | D1 | 0.1 | 100 KBYTES | A3 |
| B61 | D1 | 0.1 | 100 KBYTES | A6 |

FIG. 5

| COMMUNICATIONS DEVICE | NEIGHBORING COMMUNICATIONS DEVICE |
|---|---|
| A1 | A4 |
| A2 | A5 |
| A3 | A4 |
| A4 | A1,A5,A7 |
| A5 | A2,A6,A8 |
| A6 | A5 |
| A7 | A4 |
| A8 | A5 |

FIG. 14

| APPLICATION | READ PROPERTY | | | EDGE COMMUNICATIONS DEVICE |
|---|---|---|---|---|
| | DATA TYPE | AVERAGE READS PER SECOND | AVERAGE DATA SIZE PER READ | |
| B11 | D1 | 0.05 | 100 KBYTES | A1 |
| B12 | D1 | 0.05 | 100 KBYTES | A1 |
| B21 | D1 | 0.1 | 100 KBYTES | A2 |
| B31 | D1 | 0.05 | 100 KBYTES | A3 |
| B61 | D1 | 0.1 | 100 KBYTES | A6 |

FIG. 17

| READ APPLICATION | READ PROPERTY | | | EDGE COMMUNICATIONS DEVICE |
|---|---|---|---|---|
| | DATA TYPE | AVERAGE READS PER SECOND | AVERAGE DATA SIZE PER READ | |
| B11 | D1 | 0.1 | 100 KBYTES | A1 |
| B12 | D1 | 0.1 | 100 KBYTES | A1 |
| WRITE APPLICATION | WRITE PROPERTY | | | |
| | DATA TYPE | AVERAGE WRITES PER SECOND | AVERAGE DATA SIZE PER WRITE | |
| E71 | D1 | 0.1 | 20 KBYTES | A7 |
| E72 | D1 | 0.1 | 20 KBYTES | A7 |
| E73 | D1 | 0.1 | 20 KBYTES | A7 |
| E81 | D1 | 0.1 | 20 KBYTES | A8 |
| E82 | D1 | 0.1 | 20 KBYTES | A8 |
| E83 | D1 | 0.1 | 20 KBYTES | A8 |

FIG. 20

| READ APPLICATION | READ PROPERTY ||| EDGE COMMUNICATIONS DEVICE |
| --- | --- | --- | --- | --- |
| | DATA TYPE | AVERAGE READS PER SECOND | AVERAGE DATA SIZE PER READ | |
| B11 | D1 | 0.1 | 100 KBYTES | A1 |
| WRITE APPLICATION | WRITE PROPERTY ||| |
| | DATA TYPE | AVERAGE WRITES PER SECOND | AVERAGE DATA SIZE PER WRITE | |
| E71 | D1 | 0.1 | 20 KBYTES | A7 |
| E72 | D1 | 0.1 | 20 KBYTES | A7 |
| E73 | D1 | 0.1 | 20 KBYTES | A7 |
| E74 | D1 | 0.1 | 20 KBYTES | A7 |
| E75 | D1 | 0.1 | 20 KBYTES | A7 |
| E76 | D1 | 0.1 | 20 KBYTES | A7 |
| E77 | D1 | 0.1 | 20 KBYTES | A7 |
| E78 | D1 | 0.1 | 20 KBYTES | A7 |
| E79 | D1 | 0.1 | 20 KBYTES | A7 |
| E710 | D1 | 0.1 | 20 KBYTES | A7 |

FIG. 23

| APPLICATION | READ PROPERTY | | | EDGE COMMUNICATIONS DEVICE |
|---|---|---|---|---|
| | DATA TYPE | AVERAGE READS PER SECOND | AVERAGE DATA SIZE PER READ | UPPER LIMIT FOR DELAY TIME | |
| B11 | D1 | 0.1 | 100 KBYTES | TWO HOPS | A1 |
| B12 | D1 | 0.1 | 100 KBYTES | TWO HOPS | A1 |
| B21 | D1 | 0.1 | 100 KBYTES | TWO HOPS | A2 |
| B31 | D1 | 0.1 | 100 KBYTES | TWO HOPS | A3 |
| B61 | D1 | 0.1 | 100 KBYTES | TWO HOPS | A6 |

FIG. 32

| COMMUNICATIONS DEVICE | STORAGE USAGE RATIO[%] |
|---|---|
| A1 | 30 |
| A2 | 20 |
| A3 | 50 |
| A4 | 80 |
| A5 | 20 |
| A6 | 40 |
| A7 | 20 |
| A8 | 15 |

FIG. 35

| COMMUNICATIONS DEVICE | LOAD STATE[%] |
|---|---|
| A1 | 20 |
| A2 | 10 |
| A3 | 40 |
| A4 | 80 |
| A5 | 20 |
| A6 | 20 |
| A7 | 50 |
| A8 | 60 |

INFORMATION PROCESSING DEVICE, INFORMATION PROCESSING METHOD, AND RECORDING MEDIUM

CROSS-REFERENCE TO RELATED APPLICATION

This application is based upon and claims the benefit of priority of the prior Japanese Patent Application No. 2012-282987, filed on Dec. 26, 2012, the entire contents of which are incorporated herein by reference.

FIELD

The embodiments discussed herein are related to an information processing device, an information processing method, and a recording medium.

BACKGROUND

Data generated by sensors and other devices are used by various applications over a network, and shared between multiple companies. The data generated by sensors include sensing data such as, for example, temperature, humidity, altitude, wind speed, energy consumption, and positional information, which are measured periodically by the sensors. Data generated by devices include, for example, sales data from point of sale (POS) terminals or vending machines, and information related to operational status or service provision such as inventory data. The amount and types of data generated by sensors and other devices is significant. This data is stored in data centers and accessed by multiple users in multiple locations from multiple applications over a network, for example.

Methods for storing data over a network include, for example, methods for storing data in a central location over a network and methods for storing a copy of the data near each application. One method for storing a copy of the data near each application is the content delivery network (CDN).

FIG. 1 is a diagram illustrating an example of a content delivery network. According to a content delivery network P100, data is collected and stored in an origin server P1 in a data center P50. Client terminals #1 and #2 coupled to an access network P60 are located near the data center P50. A client terminal #3 coupled to an access network P70 and a client terminal #4 coupled to an access network P80 are located far from the data center P50. The terms near and far used here are determined, for example, by the amount of access time when downloading content data from the data center P50 to the client terminals #1 through #4.

For example, the content data is uploaded to the origin server P1 by the client terminal #1. When the user at the client terminal #2 accesses this content data, the client terminal #2 downloads the content data from the origin server P1.

Conversely, it takes time for the client terminal #3 and #4 to download the content data form the origin server P1 as they are located far from the origin server P1. This transfer of content data from the origin server P1 to the client terminal #3 and #4 cause an increase in the amount of traffic in the Internet.

For this reason, with the content delivery network P100, cache servers P2 and P3 are deployed near the client terminal #3 and #4, respectively, and copies of the content data are stored in the cache servers P2 and P3. In this case, the client terminal #3 and #4 access the cache servers P2 and P3, which are near, and this reduces the access delay from that regarding download from the origin server P1. Also, the content data no longer flows between the origin server P1 in the Internet and the cache servers P2 and P3 when the client terminal #3 and #4 download the content data. For this reason, the amount of traffic generated in the Internet by content data downloads from the client terminal #3 and #4 may be reduced.

Therefore, according to the content delivery network P100, the access delay and traffic increase when downloading content data may be reduced by deploying copies of the content data near the client terminals.

Japanese Laid-open Patent Publication No. 2004-126716 is an example of related art.

SUMMARY

According to an aspect of the invention, an information processing device includes a memory configured to store information related to data accesses by executions of a plurality of applications, and a network configuration of a network system including a plurality of communication devices and a plurality of processing devices each of which executes any one of the plurality of applications, and a processor configured to calculate traffic amounts, when each of the plurality of communication devices is assumed as a data storage location to store data to be accessed by the executions, to be generated in the network system by the executions, based on the information and the network configuration, and determine a communication device to store the data to be accessed by the executions based on the calculated traffic amounts, among the plurality of communication devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of application property information according to a first embodiment.

FIG. 5 is a diagram illustrating an example of network configuration information according to the first embodiment.

FIG. 14 is an example of application property information.

FIG. 17 is a diagram illustrating an example of application property information according to the second embodiment.

FIG. 20 is an example of application property information.

FIG. 23 is a diagram illustrating an example of application property information.

FIG. 32 is a diagram illustrating an example of a storage usage management table.

FIG. 35 is a diagram illustrating an example of a load status table.

DESCRIPTION OF EMBODIMENTS

According to the observation of the inventor, the following problems exist, for example, in the methods for storing data in a central location and methods for deploying a copy of the content data near the client terminals.

The problems according to the methods for storing data in a central location is that there is a significant delay when an application located far from the data center accesses the data, and the amount of traffic increases over the network during uploading and downloading.

The following problems exist regarding the method for deploying copies of the content data near the client terminals, for example, with the content delivery network P100. Regarding the content delivery network P100, consideration has not been given to traffic during the upload of the content data to the origin server P1 and the traffic during the copy of the content data from the origin server P1 to the cache servers P2 and P3. Therefore, despite the fact that the amount of traffic is reduced during the downloading of the content data regarding the content delivery network P100, the reduction of traffic generated throughout the entire network is not sufficiently advantageous. Also, as multiple copies of the same data exist throughout the network, the amount of storage used to store the data for the entire system becomes significant.

There is candidate that traffic will increase and storage capacity will be consumed when the data shared by multiple applications and users as described beforehand, for example, is deployed according to the method for storing data over the network of the related art.

According to the embodiments described later, the specific destination where data is stored may be determined such that data is stored efficiently with regard to the amount of traffic generated and the amount of storage for storing the data throughout the network.

Hereafter, the embodiments according to the present technology will be described with reference to the drawings. The configurations of the following embodiments are only examples, and the present technology is not limited to the configurations of these embodiments.

First Embodiment

According to a first embodiment, the storage destination for the data is determined based on properties related to application data reads.

Configuration of Communication System

Figure 1:
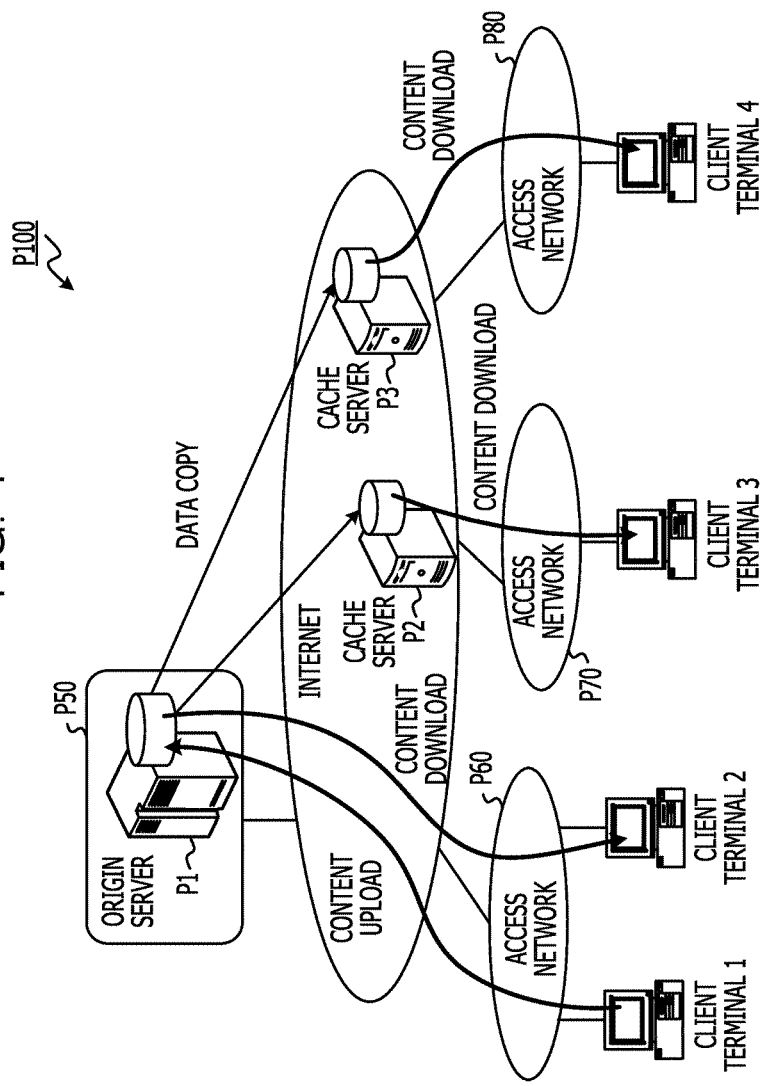
FIG. 1 is a diagram illustrating an example of a content delivery network.
Figure 2:
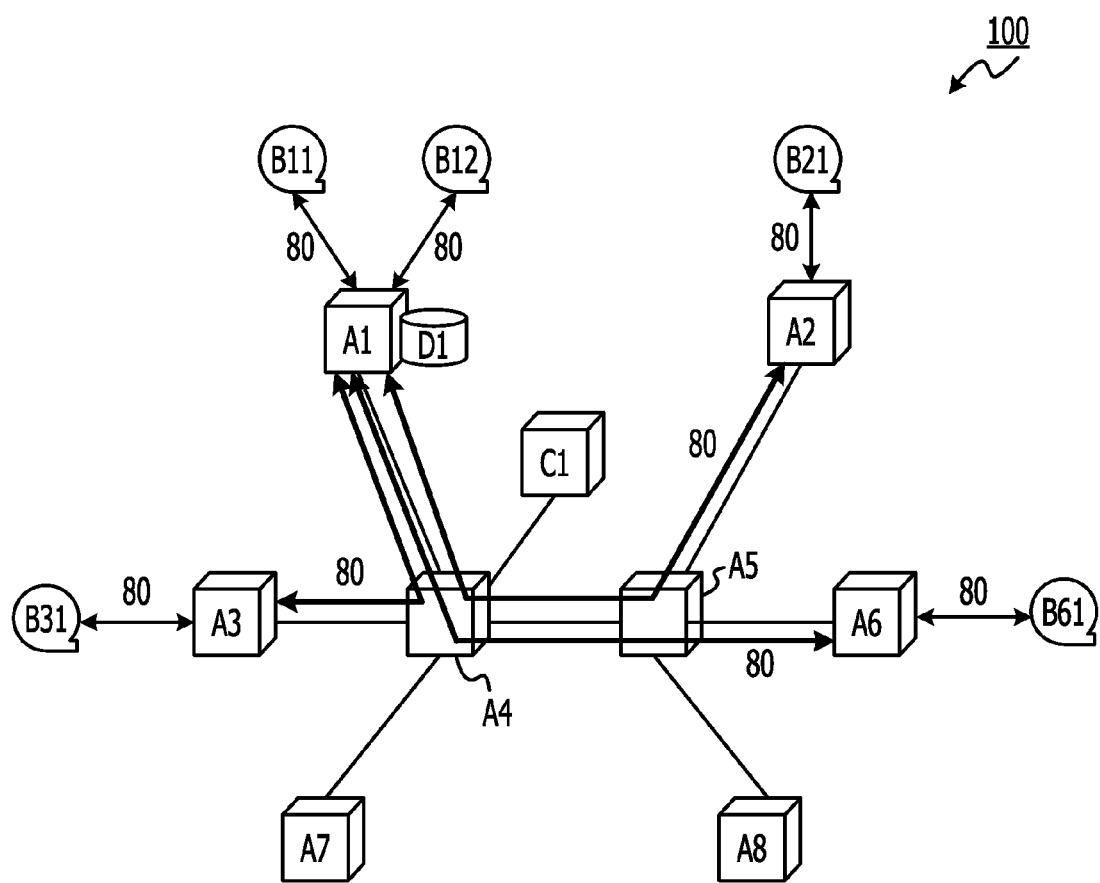
FIG. 2 is a diagram illustrating an example of a communication system.

FIG. 2 is a diagram illustrating an example of a communication system. A communication system 100 includes communications devices A1 through A8, a data D1 in which one of the communications devices A1 through A8 acts as the storage communications device, and a control device C1 which determines to which communications device the data D1 will be stored. The communications devices A1 through A8 are layer 7 switches, for example, and are provisioned with server functionality and either internal or external storage for storing the data D1. The communications devices A1 through A8 are coupled via wired connections or wirelessly, and the network architecture uses the topology as that illustrated in FIG. 2. The communications device A1 in FIG. 2 is an edge communications device including a terminal for executing an application B11 and a terminal for executing an application B12. The communications device A2 is an edge communications device including a terminal for executing an application B21. The communications device A3 is an edge communications device including a terminal for executing an application B31. The communications device A6 is an edge communications device including a terminal for executing an application B61. The control device C1 is coupled to the communications device A4. However, the control device C1 is not limited to only being coupled to communications device A4, and may be coupled to any of the communications devices in the communication system 100. The applications B11, B12, B21, B31, and B61 execute a predetermined processing to read the data D1. Hereafter, the term "application" will be used to simplify the specification of the terminals for executing the applications. The terminals for executing the applications are examples of "processing devices". The "processing devices" also include servers for executing applications, for example.

The control device C1 is present in the communication system 100 and stores information related to properties of applications that access the data D1 and information related to the network configuration of the communication system 100. Here, the accessing of data includes data reads and data writes. The information related to the properties of applications that access the data D1 is referred to as application property information. The information related to the network configuration of the communication system 100 is referred to as network configuration information. The control device C1 determines which of the communications devices A1 through A8 to store the data D1 based on the application property information and the network configuration information.

Configuration of Control Device

Figure 3A:
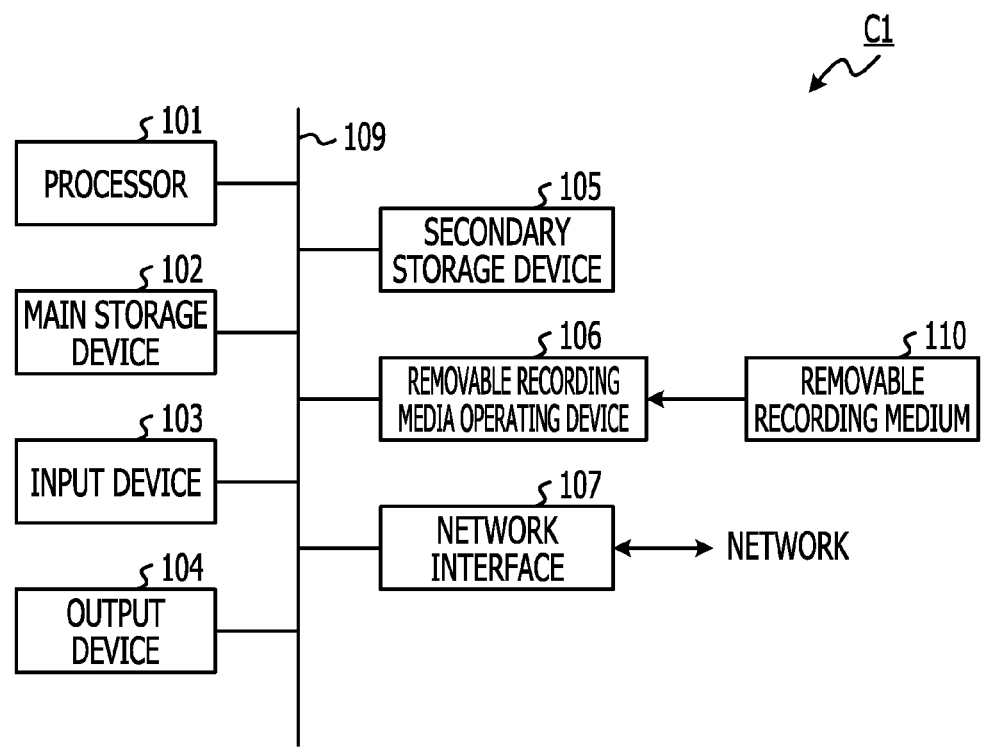
FIG. 3A is a diagram illustrating an example of a hardware configuration of a control device.

FIG. 3A is a diagram illustrating an example of a hardware configuration of the control device C1. The control device C1 is a general-purpose computer or a specialized computer acting as a server, for example. The control device C1 is provisioned with a processor 101, a main storage device 102, an input device 103, an output device 104, a secondary storage device 105, a removable recording media operating device 106, and a network interface 107. These devices are mutually coupled via a bus 109.

The input device 103 is a keyboard, pointing device such as a mouse, or other device, for example. The data input from the input device 103 is output to the processor 101.

The removable recording media operating device 106 reads program and other various data stored in a removable recording medium 110, and outputs this to the processor 101. The removable recording medium 110 include such recording media, for example, as SD cards, mini SD cards, micro SD cards, Universal Serial Bus (USB) flash memory, compact disc (CD), digital versatile disc (DVD), Blu-ray disc, and flash memory cards.

The network interface 107 is the interface handling the input and output of information with a network. The network interface 107 includes an interface for connecting to a wired network and an interface for connecting to a wireless network. The network interface 107 is a network interface card (NIC), a wireless local area network (LAN) card, or other device, for example. The data received by the network interface 107 is output to the processor 101.

The secondary storage device 105 stores the data for various programs and the data used by the processor 101 to execute these programs. The secondary storage device 105 is an erasable programmable ROM (EPROM) or a non-volatile memory such as a hard disk drive, for example. The secondary storage device 105 stores the operating system (OS), program for determining the location to store data, and other various application programs, for example.

The main storage device 102 provides storage regions for loading programs stored in the secondary storage device 105 and working regions to the processor 101, and may be used for buffers. The main storage device 102 is semiconductor memory such as random access memory (RAM), for example.

The processor 101 is a central processing unit (CPU), for example. The processor 101 executes various processing by loading and executing the OS and various application programs stored in the secondary storage device 105 and the removable recording medium 110 into the main storage device 102. The processor 101 is not limited to only one unit, and the control device may be provisioned with multiple units of the processor 101.

The output device 104 outputs the processing results from the processor 101. The output device 104 includes sound output devices such as a speaker, displays, and printers, for example.

The processor 101 in the control device C1, for example, loads to the main storage device 102 and executes the program for determining where to store the data, which is stored in the secondary storage device 105. The control device C1 determines to which of the communications devices A1 through A8 in the communication system 100 to store the data D1 by executing the program for determining where to store the data. Further, the hardware configuration of the control device C1 is only an example and not restrictive as described, and so omissions, replacements, or additions of optional configuration elements depending on the form of the embodiment are possible. The program for determining where to store the data may be recorded in the removable recording medium 110, for example. The program for determining where to store the data is an example of an "information processing program".

Figure 3B:
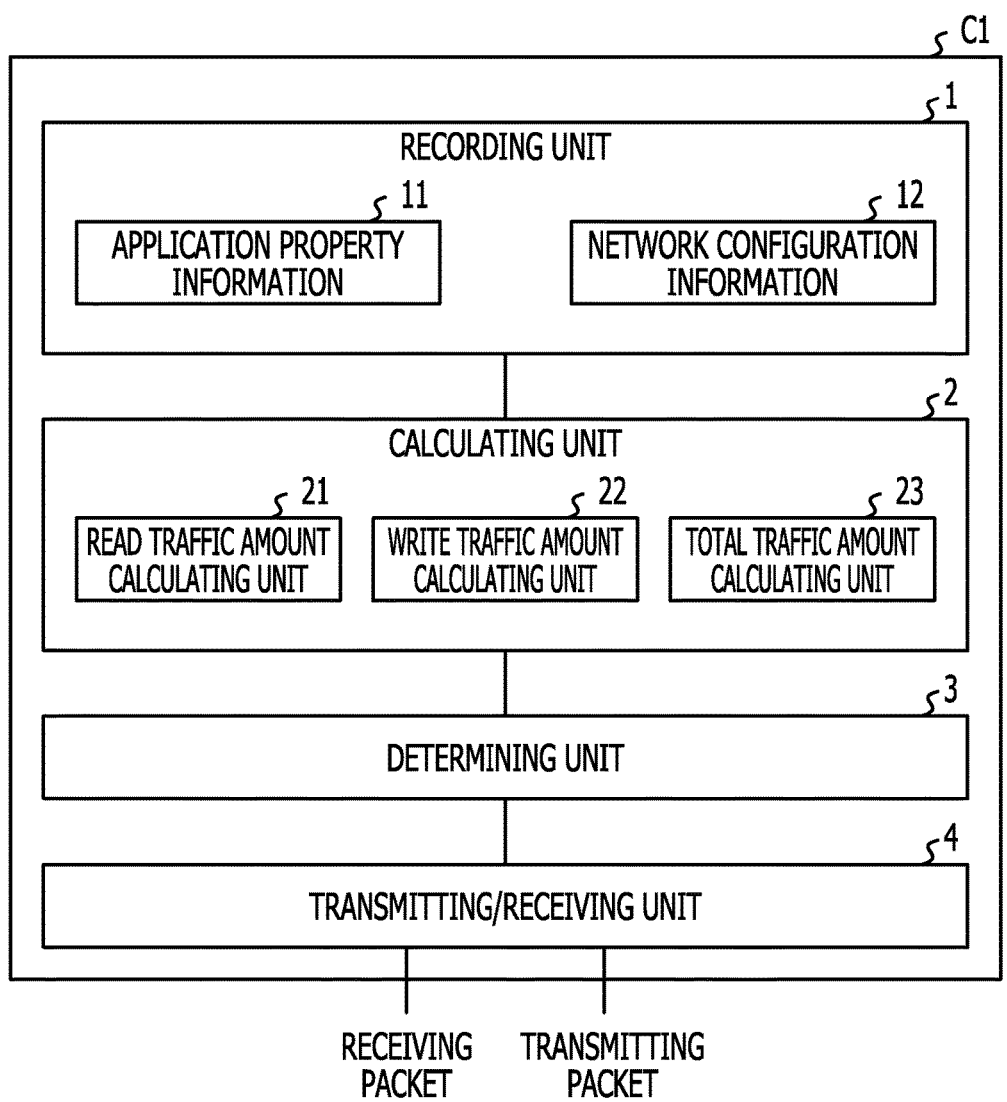
FIG. 3B is a diagram illustrating an example of a function block of the control device.

FIG. 3B is a diagram illustrating an example of a function block of the control device C1 according to the first embodiment. The control device C1 as a function block includes a recording unit 1, a calculating unit 2, a determining unit 3, and a transmitting/receiving unit 4.

The recording unit 1 is created in the recording region in the main storage device 102 and the secondary storage device 105, for example. The recording unit 1 includes an application property information 11 and a network configuration information 12. According to the first embodiment, the application property information 11 is information regarding properties related to data reads for an application accessing the data D1, which is present in the communication system 100. The application property information may be set by operational input received directly or remotely from an application user or developer, or an administrator of the communication system 100, for example. The application property information may also be collected by the transmission and reception of messages using a predetermined protocol between the devices executing the application, equipment management devices, and network management devices (not illustrated), for example. The network configuration information 12 may be set by operational input received directly or remotely from an administrator of the communication system 100, and may be collected by the transmission and reception of messages using a predetermined protocol between the communications devices A1 through A8, equipment management devices, and network management devices (not illustrated), for example. Details on the application property information 11 and the network configuration information 12 will be described later.

The calculating unit 2 and the determining unit 3 in the control device C1 are implemented, for example, by the processor 101 executing the program for determining where to store the data stored in the secondary storage device 105. Further, each function block of the calculating unit 2 and the determining unit 3 is not limited to being implemented by software processing by the processor 101, and so may also be implemented as hardware. For example, a large scale integration (LSI) and a field-programmable gate array (FPGA) may be used to implement each function block of the calculating unit 2 and the determining unit 3 as hardware.

The calculating unit 2 calculates the amount of traffic generated by accessing the data D1 for applications present in the communication system 100 in the case of determining to which of the communications devices A1 through A8 to store the data D1. The application property information and the network configuration information are used to calculate the amount of traffic generated by accessing the data D1 for applications present in the communication system 100. The calculating unit 2 includes a read traffic amount calculating unit 21, a write traffic amount calculating unit 22, and a total traffic amount calculating unit 23.

The read traffic amount calculating unit 21 calculates the amount of traffic generated by read requests corresponding to the data D1 from each application in the communication system 100. The total amount of traffic generated by read requests corresponding to the data D1 from each application in the communication system 100 is referred to as the total read traffic amount. The total read traffic amount is calculated when designating one of the communications devices A1 through A8 as the candidate communications device to store the data D1.

The write traffic amount calculating unit 22 calculates the amount of traffic generated by write requests corresponding to the data D1 from each application in the communication system 100. The total amount of traffic generated by write requests corresponding to the data D1 from each application in the communication system 100 is referred to as the total write traffic amount. The total write traffic amount is calculated when designating one of the communications devices A1 through A8 as the candidate communications device to store the data D1. However, as properties related to data writes by the applications are not considered according to the first embodiment, the write traffic amount calculating unit 22 does not operate here. The write traffic amount calculating unit 22 operates according to a second embodiment and those afterwards.

The total traffic amount calculating unit 23 sums the total read traffic amount and the total write traffic amount when designating one of the communications devices A1 through A8 as the candidate communications device storing the data D1 to calculate the total traffic amount generated in the communication system 100. As the total write traffic amount is not calculated according to the first embodiment, the total traffic amount is simply the total read traffic amount.

The determining unit 3 determines to which communications device to store the data D1 based on the total traffic amount, calculated by the calculating unit 2, when designating one of the communications devices A1 through A8 as the candidate communications device to store the data D1. The information regarding which communications device to store the data D1 is transmitted by the determining unit 3 via the transmitting/receiving unit 4 to notify the communications devices A1 through A8. The information regarding the communications device to store the data D1 may also be output to the output device 104 such as a display of the control device C1. The administrator of the communication system 100 may see the information regarding the communications device to store the data D1 output from the control device C1 and set each of the communications devices A1 through A8 as the communications device storing the data D1 by operational input received directly or remotely.

The application may obtain information on the communications device storing the data D1, that is to say, the communications device to send read requests by notifications received from an edge communications device during processing of read requests, for example. Also, the application may transmit read requests without knowledge of the communications device to store the data D1, in which case the edge communications device may forward the read request to the communications device to store the data D1. Each application may also transmit read requests to the edge communications device specifying identifiers representing where the data D1 is stored, and the edge communications device may forward the read request after adding a correspondence to the actual communications device storing the data D1 from the identifier. The identifiers representing where the data D1 is stored include machine names and uniform resource locators (URLs), for example.

The transmitting/receiving unit 4 is a network interface corresponding to the network interface 107, for example, and transmits and receives packets such as control messages.

FIG. 4 is a diagram illustrating an example of the application property information according to the first embodiment. According to the first embodiment, read properties are used as the application properties. According to the example illustrated in FIG. 4, the read properties include the data type, average reads per second, and average data size per read. However, the read properties used as the application properties are not limited thusly. The application property information illustrated in FIG. 4 stores the average reads per second as certain applications read data at predetermined intervals, and others read data the moment a predetermined event occurs, and so the intervals of these data reads are not determined.

The application property information illustrated in FIG. 4 includes the read properties for each application and the edge communications device including the terminal devices executing the applications. This information may store the number of terminal devices contained by each edge communications device, for example, when one edge communications device contains multiple terminal devices that execute the same application.

For example, the information may represent that the application B11 reads the data D1 an average of 0.1 times per second, that is to say, an average of 100 kilobytes of data per read at intervals of 10 seconds from the communications device storing the data.

FIG. 5 is a diagram illustrating an example of the network configuration information according to the first embodiment. The network configuration information illustrated in FIG. 5 stores the communications device neighboring each of the communications devices A1 through A8 present in the communication system 100. That is to say, the network configuration information illustrated in FIG. 5 stores the neighboring relationships of the communications devices. However, the network configuration information is not limited to storing only the neighboring relationships of the communications devices. The network configuration information may, for example, be a matrix representing the existence of neighboring relationships with the communications devices, or may be a network topology map.

Processing to Determine the Storage Location

Regarding the processing to determine the storage location for the data according to the first embodiment, the control device C1 determines one of the communications devices in the communication system 100 as the communications device to store the data. Specifically, the control device C1 designates one of the communications devices as a candidate communications device to store the data, and calculates the total read traffic amount generated on the network by read requests from applications corresponding to the storage communications device. Next, the control device C1 designates each communications device as the candidate storage communications device and calculates the total read traffic amount for each scenario. The control device C1 determines the communications device to store the data as the communications device with the smallest total read traffic amount calculated for each device. Further, the network as used here specifies the network configured by the connections between the communications devices, it does not include the connections between the edge communications devices and the applications.

Next, the control device C1 stores the application property information 11 illustrated in FIG. 4 and the network configuration information 12 illustrated in FIG. 5, and uses this to perform the processing to determine the data to store.

FIG. 2 is a diagram illustrating an example of traffic generated in the communication system 100 when the communications device A1 is assumed as the storage location for the data D1.

First, the read traffic amount calculating unit 21 in the control device C1 calculates the total traffic amount generated by read requests corresponding to the data D1 from applications B11, B12, B21, B31, and B61. The traffic amount generated by read requests corresponding to the data D1 from the applications B11, B12, B21, B31, and B61 are obtained from the application property information 11 illustrated in FIG. 4, which for example is 80 kbps as the result of calculating the properties of 100 kb per read eight times at a rate of 0.1 times per second. As a result, the read traffic amount from the applications B11, B12, B21, B31, and B61 between the edge communications devices A1, A2, A3, and A6 is calculated.

Next, the read traffic amount calculating unit 21 in the control device C1 calculates the read traffic amount generated between each edge communications device A1, A2, A3, and A6 and the storage communications device A1 for the data D1.

The communications device A1 is the edge communications device for applications B11 and B12 and generates a total of 160 kbps of read traffic corresponding to the communications device storing the data D1 from the read requests from the applications B11 and B12. However, the communications device A1 is the communications device storing the data D1, and so read traffic is not generated between the communications devices for reading the data D1. Therefore, the read traffic amount between the communications device A1 and the storage communications device is zero.

The communications device A2 is the edge communications device for the application B21 and generates a total of 80 kbps of read traffic corresponding to the communications device A1 storing the data D1 regarding the read requests from the application B21. Based on the network configuration information 12, the read traffic is forwarded from the storage communications device A1 to the communications device A2 over a path of three links, one between the communications device A1 and the communications device A4, one between the communications device A4 and the communications device A5, and one between the communications device A5 and the communications device A2. For this reason, according to the first embodiment, the read traffic between the communications device A2 and the storage communications device A1 is the total read traffic generated at each link along the path of communications devices. Therefore, the read traffic amount generated between the communications device A2 and the storage communications device A1 is calculated as 240 kbps as the result of multiplying 80 kbps by three.

The communications device A3 is the edge communications device for the application B31 and generates a total of 80 kbps of read traffic corresponding to the communications device A1 storing the data D1 from the read requests from the application B31. Based on the network configuration information 12, the read traffic is forwarded from the storage communications device A1 to the communications device A3 over two links and one between the communications device A1 and the communications device A4, one between the communications device A4 and the communications device A3. Therefore, the read traffic amount generated between the communications device A3 and the storage communications device A1 is calculated as 160 kbps as the result of multiplying 80 kbps by two.

The communications device A6 is the edge communications device for the application B61 and generates a total of 80 kbps of read traffic corresponding to the communications device A1 storing the data D1 regarding the read requests from the application B61. Based on the network configuration information 12, the read traffic is forwarded from the storage communications device A1 to the communications device A6 over a path of three links, one between the communications device A1 and the communications device A4, one between the communications device A4 and the communications device A5, and one between the communications device A5 and the communications device A6. Therefore, the read traffic amount generated between the communications device A6 and the storage communications device A1 is calculated as 240 kbps as the result of multiplying 80 kbps by three.

The communications devices A4, A5, A7, and A8 are not edge communications devices, and so read traffic with the storage communications device A1 for the data D1 is not generated from these communications devices, in which case the read traffic amount is not calculated.

The read traffic amount calculating unit 21 in the control device C1 calculates the sum of the read traffic amounts generated between the storage communications device A1 and each edge communications device A1, A2, A3, and A6 to determine the total read traffic amount generated on the network when designating the communications device A1 as the storage communications device. The total read traffic amount generated on the network when the communications device A1 is designated as the candidate storage communications device is 640 kbps as the sum of 0, 240, 160, and 240.

Figure 6:
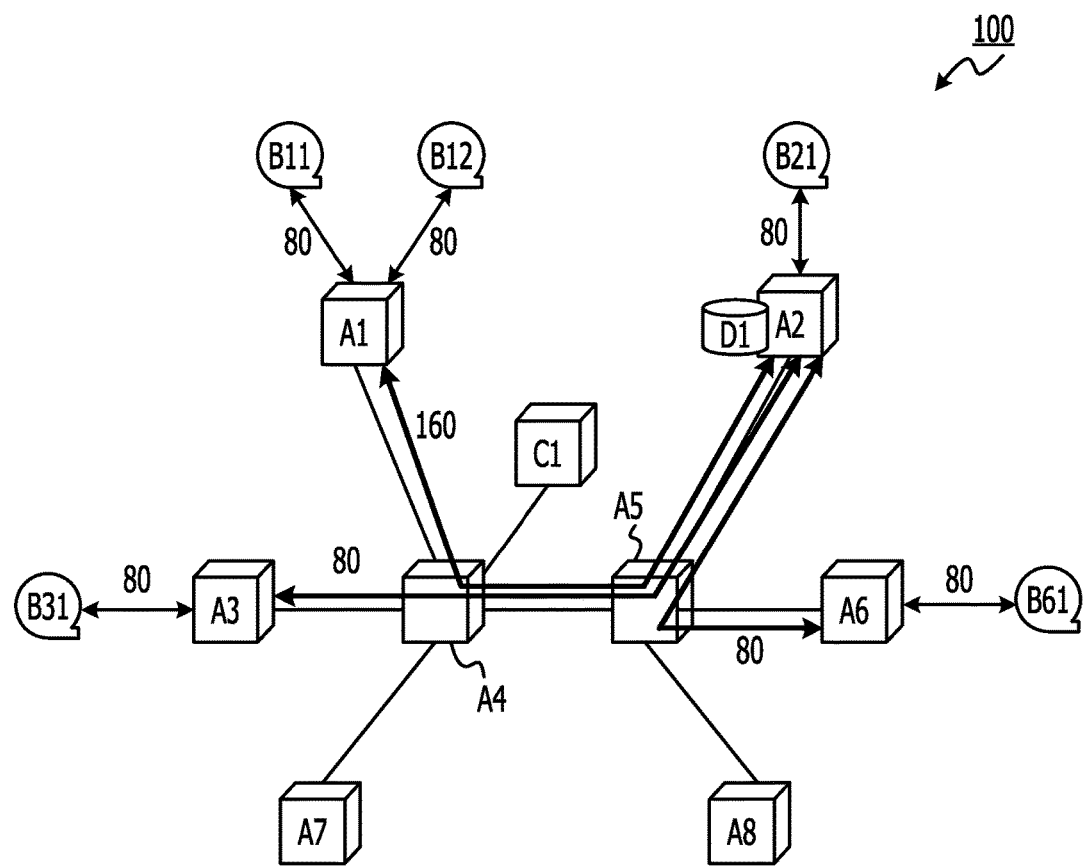
FIG. 6 is a diagram illustrating an example of traffic generated in a network when a communications device is designated as the candidate storage destination for a data.

FIG. 6 is a diagram illustrating an example of traffic generated on the network when the communications device A2 is designated as the candidate communications device to store the data D1.

The read traffic amount generated between the storage communications device A2 and each edge communications device A1, A2, A3, and A6 is listed below.
Communications device A1: 160×3=480 kbps
Communications device A2: 0 kbps
Communications device A3: 80×3=240 kbps
Communications device A6: 80×2=160 kbps Therefore, the total read traffic amount generated on the network when the communications device A2 is designated as the candidate storage communications device is 880 kbps as the sum of 480, 0, 240, and 160.

Figure 7:
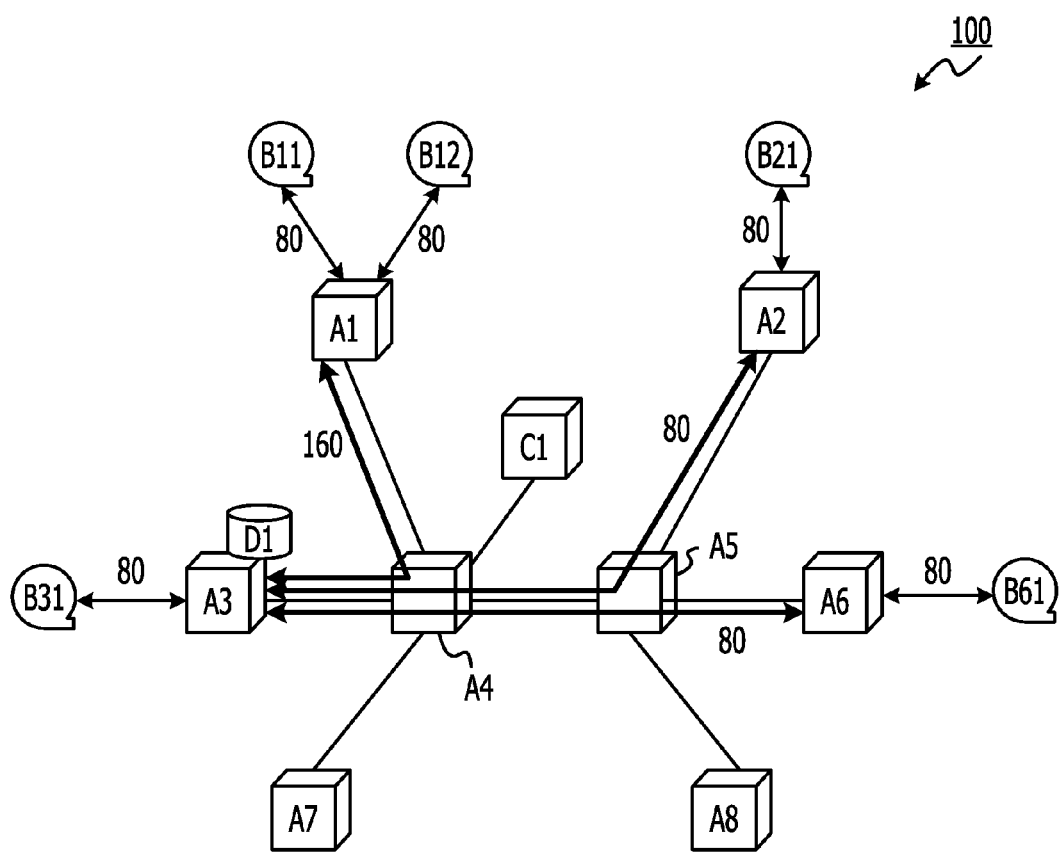
FIG. 7 is a diagram illustrating an example of traffic generated in a network when a communications device is designated as the candidate storage destination for the data.

FIG. 7 is a diagram illustrating an example of traffic generated on the network when the communications device A3 is designated as the candidate communications device to store the data D1.

The read traffic amount generated between the storage communications device A3 and each edge communications device A1, A2, A3, and A6 is listed below.
Communications device A1: 160×2=320 kbps
Communications device A2: 80×3=240 kbps
Communications device A3: 0 kbps
Communications device A6: 80×3=240 kbps Therefore, the total read traffic amount generated on the network when the communications device A3 is designated as the candidate storage communications device is 800 kbps as the sum of 320, 240, 0, and 240.

Figure 8:
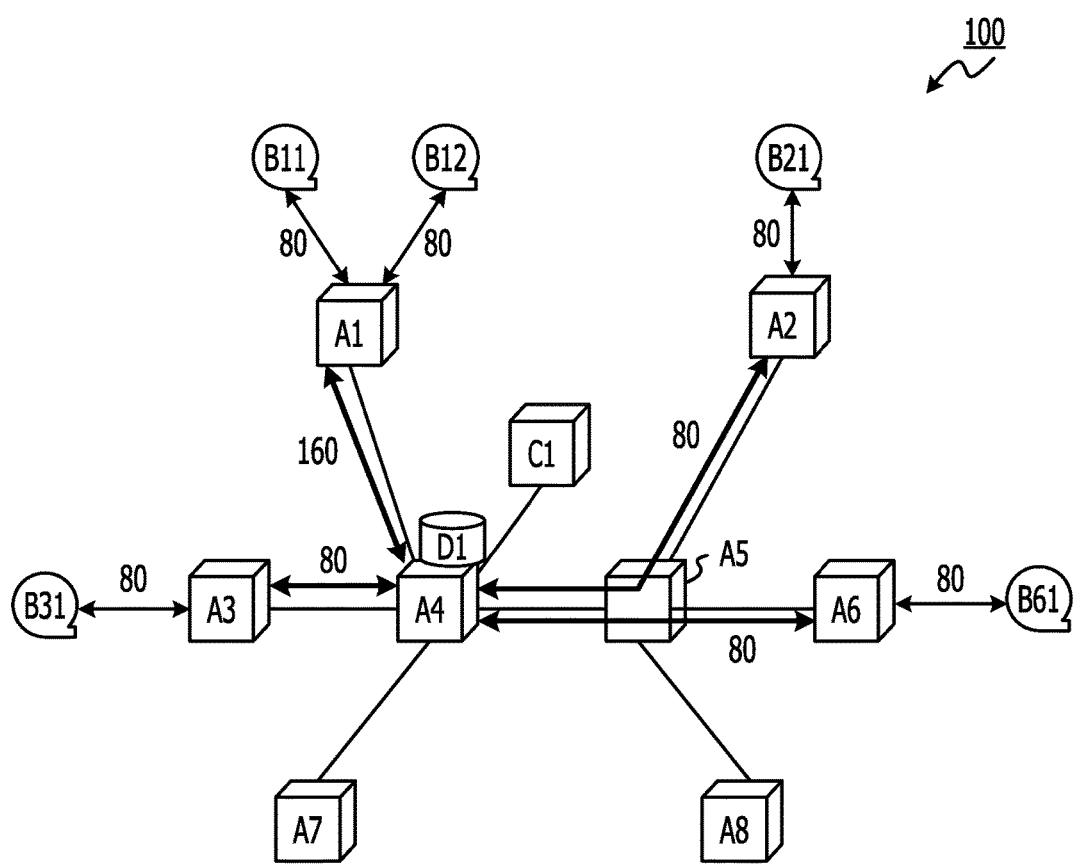
FIG. 8 is a diagram illustrating an example of traffic generated in a network when a communications device is designated as the candidate storage destination for the data.

FIG. 8 is a diagram illustrating an example of traffic generated on the network when the communications device A4 is designated as the candidate communications device to store the data D1.

The read traffic amount generated between the storage communications device A4 and each edge communications device A1, A2, A3, and A6 is listed below.
Communications device A1: 160×1=160 kbps
Communications device A2: 80×2=160 kbps
Communications device A3: 80×1=80 kbps
Communications device A6: 80×2=160 kbps Therefore, the total read traffic amount generated on the network when the communications device A4 is designated as the candidate storage communications device is 560 kbps as the sum of 160, 160, 80, and 160.

Figure 9:
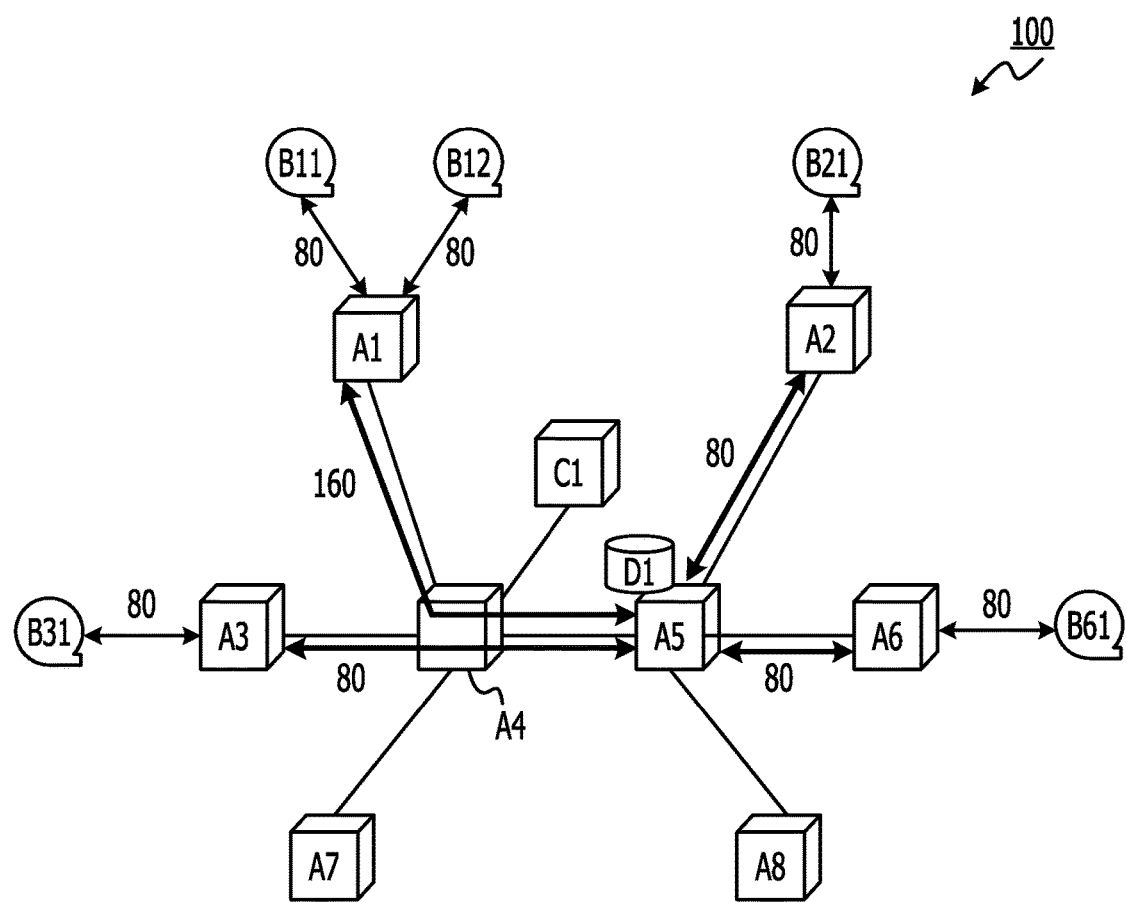
FIG. 9 is a diagram illustrating an example of traffic generated in a network when a communications device is designated as the candidate storage destination for the data.

FIG. 9 is a diagram illustrating an example of traffic generated on the network when the communications device A5 is designated as the candidate communications device to store the data D1.

The read traffic amount generated between the storage communications device A5 and each edge communications device A1, A2, A3, and A6 is listed below.
Communications device A1: 160×2=320 kbps
Communications device A2: 80×1=80 kbps
Communications device A3: 80×2=160 kbps
Communications device A6: 80×1=80 kbps Therefore, the total read traffic amount generated on the network when the communications device A5 is designated as the candidate storage communications device is 640 kbps as the sum of 320, 80, 160, and 80.

Figure 10:
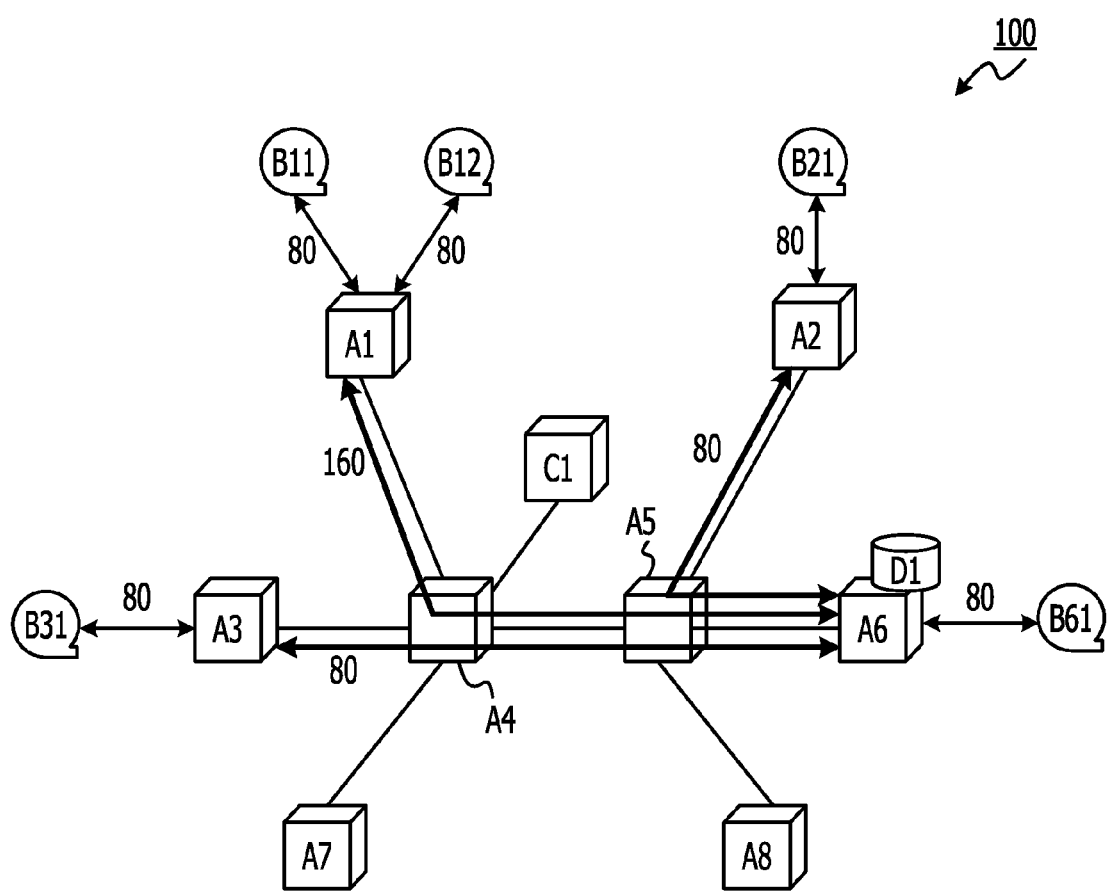
FIG. 10 is a diagram illustrating an example of traffic generated in a network when a communications device is designated as the candidate storage destination for the data.

FIG. 10 is a diagram illustrating an example of traffic generated on the network when the communications device A6 is designated as the candidate communications device to store the data D1.

The read traffic amount generated between the storage communications device A6 and each edge communications device A1, A2, A3, and A6 is listed below.
Communications device A1: 160×3=480 kbps
Communications device A2: 80×2=160 kbps
Communications device A3: 80×3=240 kbps
Communications device A6: 0 kbps Therefore, the total read traffic amount generated on the network when the communications device A6 is designated as the candidate storage communications device is 880 kbps as the sum of 480, 160, 240, and 0.

Figure 11:
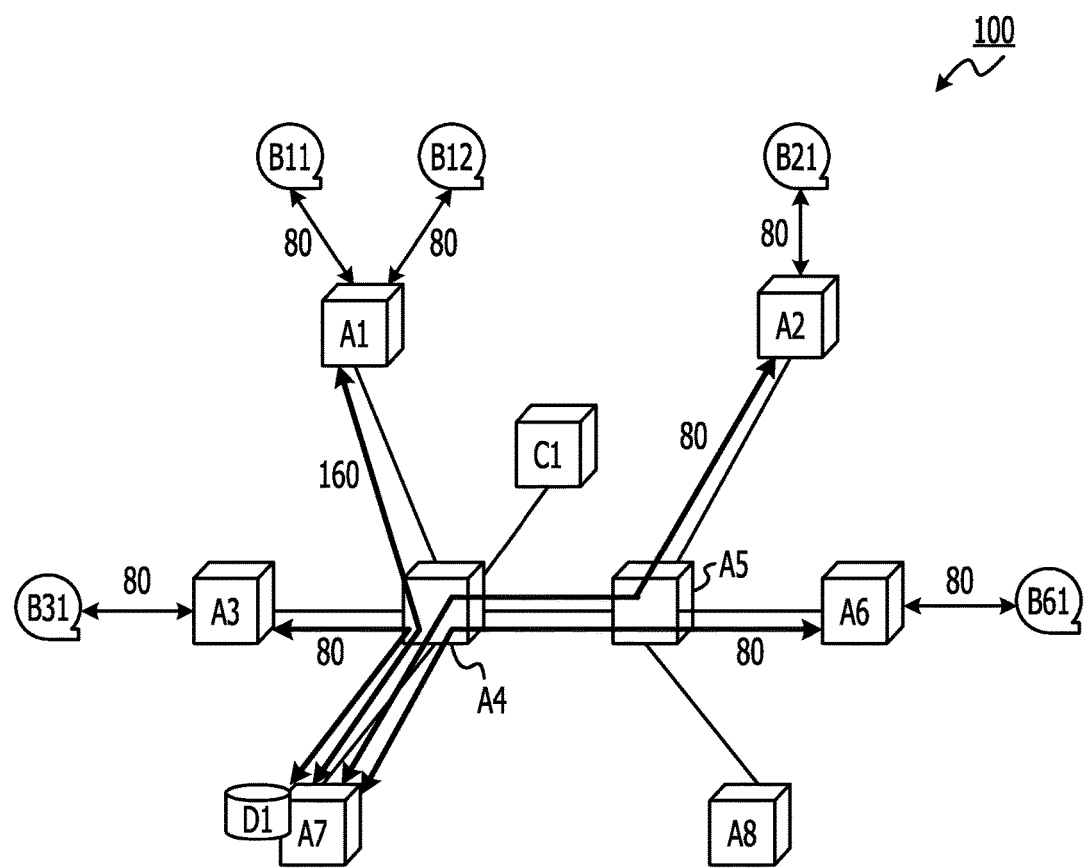
FIG. 11 is a diagram illustrating an example of traffic generated in a network when a communications device is designated as the candidate storage destination for the data.

FIG. 11 is a diagram illustrating an example of traffic generated on the network when the communications device A7 is designated as the candidate communications device to store the data D1.

The read traffic amount generated between the storage communications device A7 and each edge communications device A1, A2, A3, and A6 is listed below.
Communications device A1: 160×2=320 kbps
Communications device A2: 80×3=240 kbps
Communications device A3: 80×2=160 kbps
Communications device A6: 80×3=240 kbps Therefore, the total read traffic amount generated on the network when the communications device A7 is designated as the candidate storage communications device is 960 kbps as the sum of 320, 240, 160, and 240.

Figure 12:
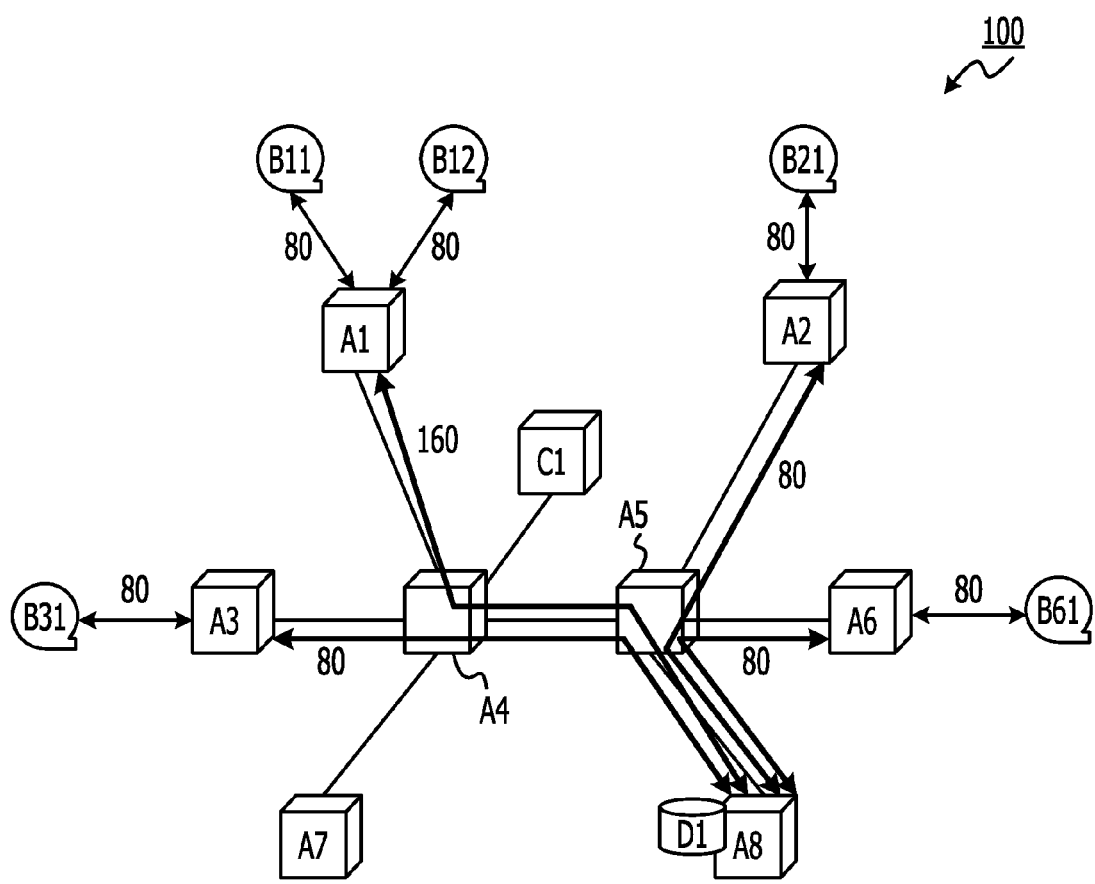
FIG. 12 is a diagram illustrating an example of traffic generated in a network when a communications device is designated as the candidate storage destination for the data.

FIG. 12 is a diagram illustrating an example of traffic generated on the network when the communications device A8 is designated as the candidate communications device to store the data D1.

The read traffic amount generated between the storage communications device A8 and each edge communications device A1, A2, A3, and A6 is listed below.
Communications device A1: 160×3=480 kbps
Communications device A2: 80×2=160 kbps
Communications device A3: 80×3=240 kbps
Communications device A6: 80×2=160 kbps Therefore, the total read traffic amount generated on the network when the communications device A8 is designated as the candidate storage communications device is 1040 kbps as the sum of 480, 160, 240, and 160.

According to the first embodiment, the total read traffic amount generated by read requests corresponding to the data D1 from the applications is the total traffic amount generated by the applications accessing the data D1. Therefore, the total traffic amount generated on the network for each case of designating the communications devices A1 through A8 as the candidate communications device to store the data D1 calculated by the total traffic amount calculating unit 23 in the control device C1 is listed below.
Communications device A1: 640 kbps
Communications device A2: 880 kbps
Communications device A3: 800 kbps
Communications device A4: 550 kbps
Communications device A5: 640 kbps
Communications device A6: 880 kbps
Communications device A7: 960 kbps
Communications device A8: 1040 kbps The determining unit 3 in the control device C1 determines the communications device to store the data D1 as the communications device with the smallest total traffic amount generated on the network as calculated when designating each communications devices A1 through A8 as the candidate communications device to store the data D1. Therefore, the communications device A4 is determined as the communications device to store the data D1 in the communication system 100, as this has the smallest total traffic amount generated on the network. Further, when there are multiple communications devices generating the smallest total traffic amount on the network, one communications device is determined as the communications device to store the data D1 based on priority, for example. Examples of priority include a priority set for each communications device by the administrator of the communication system 100, the media access control (MAC) address of each communications device, remaining storage capacity, and load.

The determining unit 3 in the control device C1 may notify the determined storage communications device to each of the communications devices A1 through A8, for example, or may notify a management device (not illustrated) for the communication system 100, which adds a correspondence between the data and the storage communications device. When the determined storage communications device is notified to the management device, each of the communications devices A1 through A8 obtain the determined storage communications device by sending an inquiry to the management device. Further, a similar processing may be performed for each data type when there are multiple data types.

Process Flow

Figure 13:
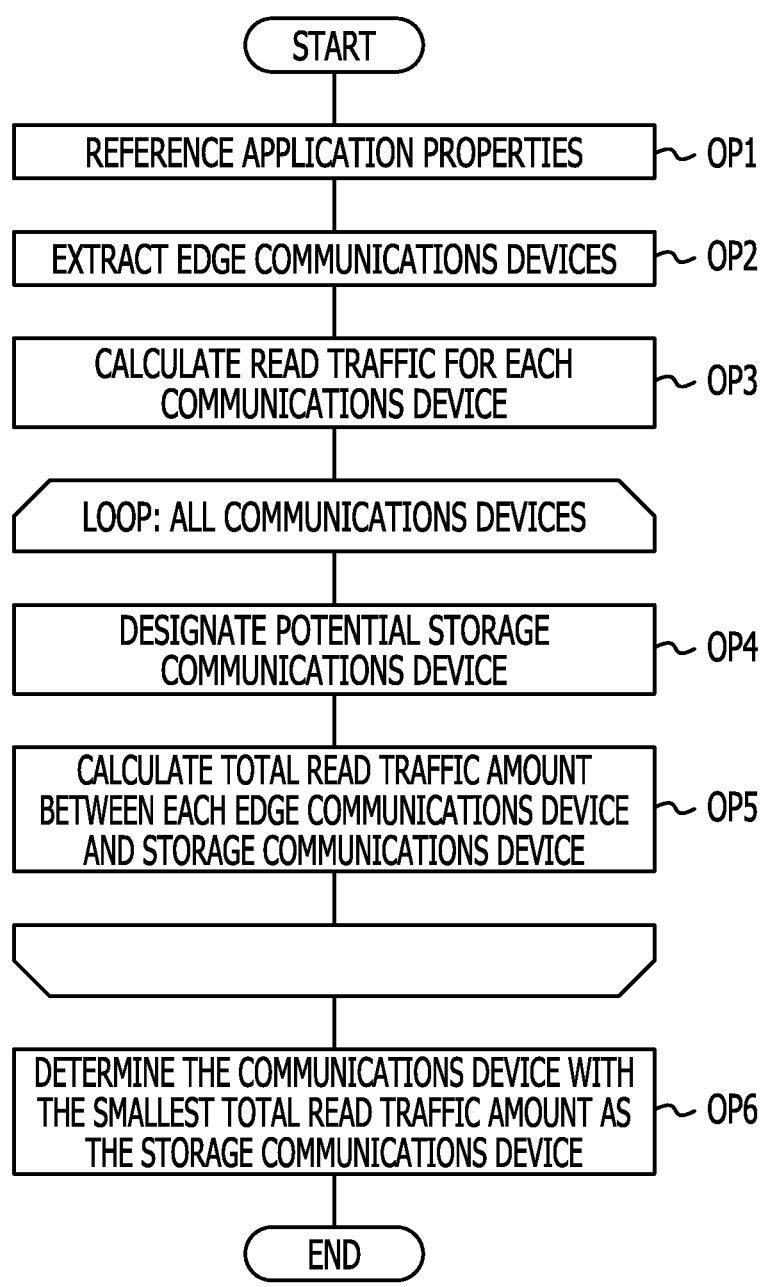
FIG. 13 is a diagram illustrating an example flowchart of a processing to determine the data storage location performed by a control device.

FIG. 13 is a diagram illustrating an example flowchart of a processing to determine the data storage location performed by a control device C1. The flowchart illustrated in FIG. 13 is started by operational input received directly or remotely from the administrator of the communication system 100 at predetermined intervals, for example. Examples of the predetermined interval include once per day, once per week, and once per month. The operational input from the administrator occurs, for example, when operation of the communication system 100 is first started, when there are changes to the network configuration of the communication system 100, when there are adds or deletions of data types, when there adds or deletions of applications, and so on.

At an OP1, the processor 101 references the application property information. At an OP2, the processor 101 extracts the edge communications device based on the application property information. At an OP3, the processor 101 calculates the read traffic amount generated between each application and each edge communications device.

At an OP4, the processor 101 designates one of the communications devices A1 through A8 in the communication system 100 as the candidate communications device to store the data D1. At an OP5, the processor 101 calculates the read traffic amount generated between the storage communications device and each edge communications device, and calculates the total (total read traffic amount). The processing at the OP4 and OP5 are repeatedly executed for all communications devices present in the communication system 100.

At an OP6, the processor 101 determines the storage communications device as the communications device with the smallest total read traffic amount. Afterwards, the processing illustrated in FIG. 13 terminates.

Further, the processing to determine the data storage location illustrated in FIG. 13 is repeatedly executed for each data type when there are multiple data types present.

The processing at the OP1 through OP5 corresponds to the processing by the read traffic amount calculating unit 21. The processing at the OP6 corresponds to the processing by the determining unit 3.

Specific Example of the First Embodiment

The read properties in the application property information illustrated in FIG. 4 are the same for all applications. Also, the communications device A4 is determined as the communications device to store the data D1 when using the application property information illustrated in FIG. 4.

Hereafter, the processing to determine the storage location for the data D1 will be described for a case in which the read properties are different for each application.

FIG. 14 is an example of the application property information. Similar to the application property information illustrated in FIG. 4, the application property information illustrated in FIG. 14 includes as the read property the data type, the average reads per second, and the average data size per read. However, the difference between the application property information illustrated in FIG. 4 is that the average reads per second is 0.05 times (interval of once per 20 seconds) for applications B11, B12, and B31, and is 0.1 times (interval of once per 10 seconds) for the applications B21 and B61.

Each total read traffic amount generated on the network when designating each of the communications devices A1 through A8 as the candidate communications device to store the data D1 using the application property information illustrated in FIG. 14 is listed below.

Communications device A1: 0+80×3+40×2+80×3=560 kbps

Communications device A2: (40+40)×3+0+40×3+80×2=520 kbps

Communications device A3: (40+40)×2+80×3+0+80×3=640 kbps

Communications device A4: (40+40)×1+80×2+40×1+80×2=440 kbps

Communications device A5: (40+40)×2+80×1+40×2+80×1=400 kbps

Communications device A6: (40+40)×3+80×2+40×3+0=520 kbps

Communications device A7: (40+40)×2+80×3+40×2+80×3=720 kbps

Communications device A8: (40+40)×3+80×2+40×3+80×2=680 kbps

Figure 15:
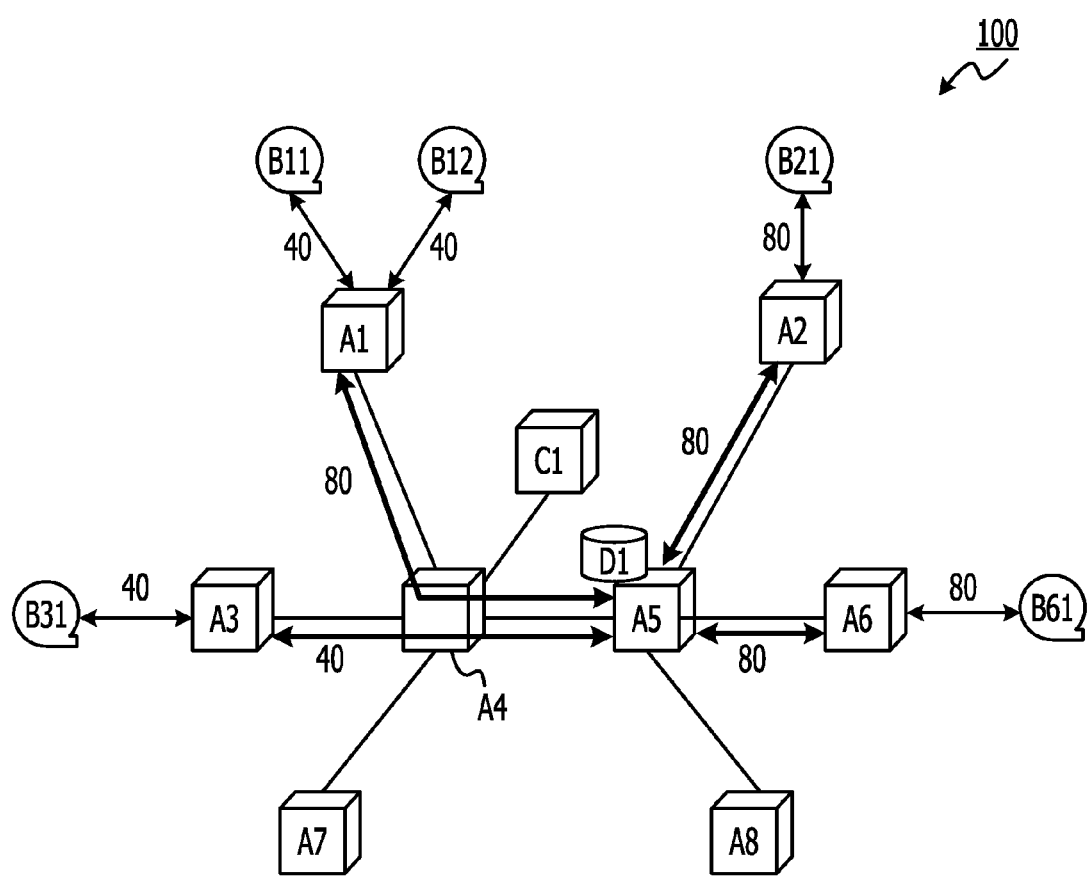
FIG. 15 is a diagram illustrating an example of read traffic when the communications device is designated as the candidate storage destination for the data.

Therefore, the communications device A5 is determined as the communications device to store the data D1 when using the application property information illustrated in FIG. 14. FIG. 15 is a diagram illustrating an example of read traffic when the communications device A5 is designated as the candidate storage destination for the data D1.

Operational Advantages of the First Embodiment

According to the first embodiment, the control device C1 stores the application property information and the network configuration information, and calculates the total read traffic amount generated by each application when designating the communications devices A1 through A8 as the candidate communications device to store the data D1 based on this information. The communications device which has the smallest total read traffic amount is selected as the communications device to store the data D1. As a result, the destination to store the data may be determined such that storage space is efficiently used in the network and the amount of traffic generated on the network is reduced by the consideration of the read properties of each application.

Second Embodiment

According to a second embodiment, the communications device to store the data is determined with consideration to applications sending write requests in addition to the applications sending read requests corresponding to the data. That is to say, according to the second embodiment, write properties are considered in addition to the read properties as the application properties to determine the communications device to store the data. The write properties specify properties related to the processing of data writes by applications. The descriptions according to the second embodiment that are shared with the first embodiment will be omitted.

Figure 16:
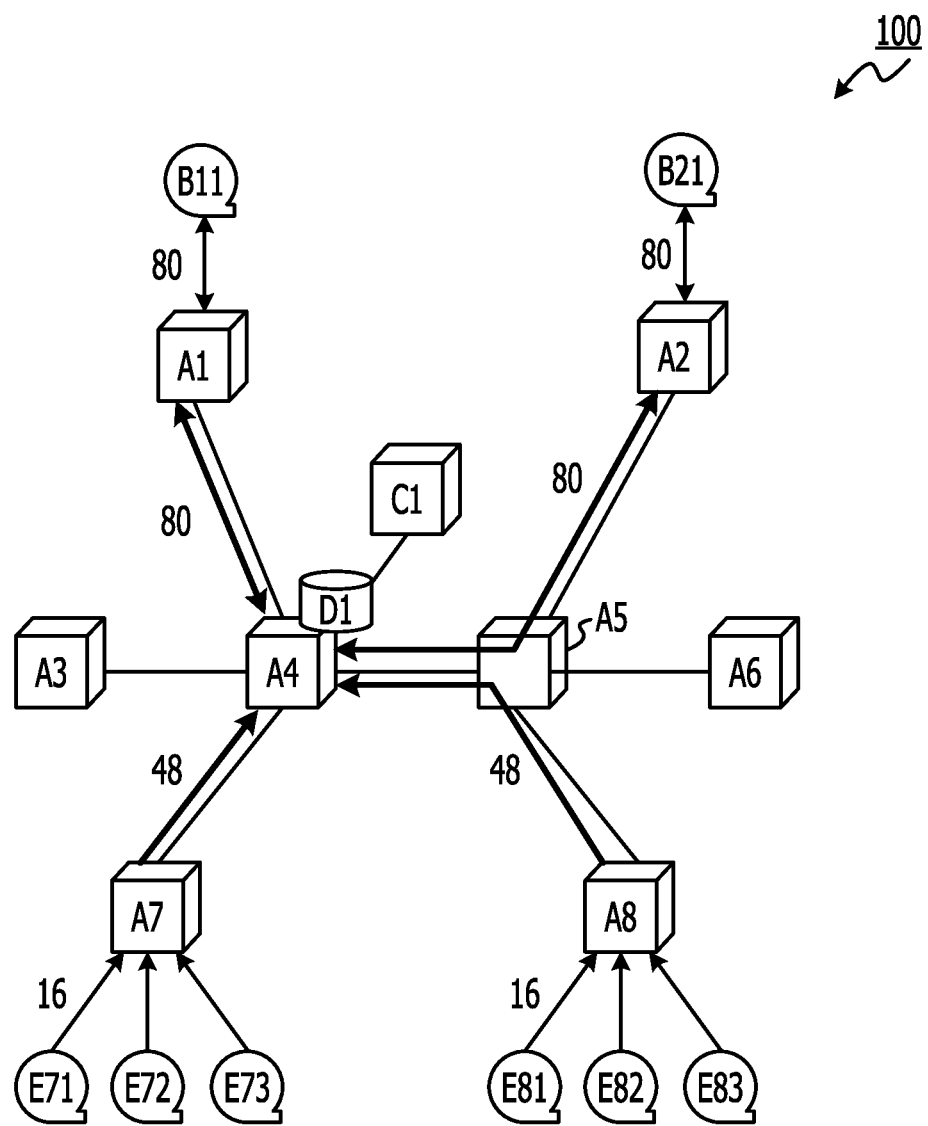
FIG. 16 is a diagram illustrating a communication system according to a second embodiment.

FIG. 16 is a diagram illustrating the communication system 100 according to the second embodiment. The communication system 100 regarding the second embodiment is the same as that regarding the first embodiment, except that with the second embodiment, applications writing the data are also taken into consideration. For this reason, in addition to the read applications B11 and B21 sending read requests corresponding to the data D1, write applications E71, E72, E73, E81, E82, and E83 sending write requests corresponding to the data D1 are also included. The write applications E71, E72, and E73 are contained in the communications device A7. The write applications E81, E82, and E83 are contained in the communications device A8. The applications sending write requests corresponding to the data D1 are applications for collecting sensor data running on a sensor terminal, for example, periodically generate measure data of the sensors, and transmit this for storage via the edge communications devices.

According to the second embodiment, the hardware configuration and functional blocks of the control device C1 are the same as that regarding the first embodiment. According to the second embodiment, the write traffic amount calculating unit 22 in the control device C1 also operates.

The write traffic amount calculating unit 22 in the control device C1 calculates the total write traffic amount generated by write requests from each write application when each communications device is designated as the candidate communications device to store the data. The total write traffic amount is calculated in the same way as the total read traffic amount.

According to the second embodiment, the total traffic amount calculating unit 23 calculates the total traffic amount as a sum of the total read traffic amount calculated by the read traffic amount calculating unit 21 and the total write traffic amount calculated by the write traffic amount calculating unit 22 for each communications device.

FIG. 17 is a diagram illustrating an example of the application property information according to the second embodiment. According to the second embodiment, read properties and write properties are used as the application properties. According to the example illustrated in FIG. 17, the data type, average writes per second, and average data size per write are used as the write properties in addition to the read properties described regarding the first embodiment. However, the write properties used as the application properties are not limited to these parameters.

Processing to Determine the Data Storage Location According to the Second Embodiment According to the processing to determine the data storage location regarding the second embodiment, in addition to the total read traffic amount described regarding the first embodiment, the total write traffic amount generated by write requests from each application is calculated for each communications device when designated as the candidate communications device to store the data. The control device C1 calculates the total traffic amount generated on the network for each communications device when designated as the candidate storage communications device by summing the total read traffic amount and the total write traffic amount calculated for each communications device. The control device C1 determines the communications device to store the data as the communications device with the smallest total traffic amount calculated for each communications device.

Hereafter, the control device C1 stores the application property information illustrated in FIG. 17 and the network configuration information illustrated in FIG. 5, and performs the processing to determine the data storage location using this information.

FIG. 16 is a diagram illustrating an example of traffic generated on the communication system 100 when the communications device A4 is designated as the candidate communications device to store the data D1, according to the second embodiment.

The read traffic amount calculating unit 21 in the control device C1 calculates the total read traffic amount when the communications device A4 is designated as the candidate communications device to store the data D1. The read traffic is generated between the communications device A1 and the communications device A4, and between the communications device A2 and the communications device A4 based on the read requests from the applications B11 and B21. Therefore, the total read traffic when the communications device A4 is designated as the candidate communications device to store the data D1 is 240 kbps as the result of 80 times one plus 80 times two.

The write traffic amount calculating unit 22 in the control device C1 calculates the total write traffic amount when the communications device A4 is designated as the candidate communications device to store the data D1. The write traffic is generated between the communications device A7 and the communications device A4, and between the communications device A8 and the communications device A4 based on the write requests from the applications E71, E72, E73, E81, E82, and E83. Therefore, the total write traffic when the communications device A4 is designated as the candidate communications device to store the data D1 is 144 kbps as the result of ((16+16+16)×1+(16+16+16)×2).

The total traffic amount calculating unit 23 in the control device C1 calculates the total traffic amount when the communications device A4 is designated as the candidate communications device to store the data D1. The total traffic amount when the communications device A4 is designated as the candidate communications device to store the data D1 is the sum of the total read traffic amount and the total write traffic amount for the communications device A4. Therefore, the total traffic when the communications device A4 is designated as the candidate communications device to store the data D1 is 384 kbps as the result of 240 plus 144.

The total traffic amount for each of the communications devices A1 through A8 when designated as the candidate communications device to store the data D1, calculated in the same way, is listed below.

Communications device A1: 80×0+80×3+(16+16+16)×2+(16+16+16)×3=480 kbps

Communications device A2: 80×3+80×0+(16+16+16)×3+(16+16+16)×2=480 kbps

Communications device A3: 80×2+80×3+(16+16+16)×2+(16+16+16)×3=640 kbps

Communications device A4: 80×1+80×2+(16+16+16)×1+(16+16+16)×2=384 kbps

Communications device A5: 80×2+80×1+(16+16+16)×2+(16+16+16)×1=384 kbps

Communications device A6: 80×3+80×2+(16+16+16)×3+(16+16+16)×2=640 kbps

Communications device A7: 80×2+80×3+(16+16+16)×0+(16+16+16)×3=544 kbps

Communications device A8: 80×3+80×2+(16+16+16)×3+(16+16+16)×0=544 kbps

The determining unit 3 in the control device C1 determines the communications device to store the data D1 as the communications device with the smallest total traffic amount generated on the network when designated as the communications device to store the data D1. Therefore, either the communications device A4 or the communications device A5 is determined as the communications device to store the data D1 in the communication system 100, as they generate the smallest amount of total traffic on the network. The determination of either the communications device A4 or the communications device A5 as the communications device to store the data D1 is determined, for example, by a priority set for each communications device by the administrator of the communication system 100, the MAC address of each communications device, the remaining storage amount, or the load.

Process Flow

Figure 18:
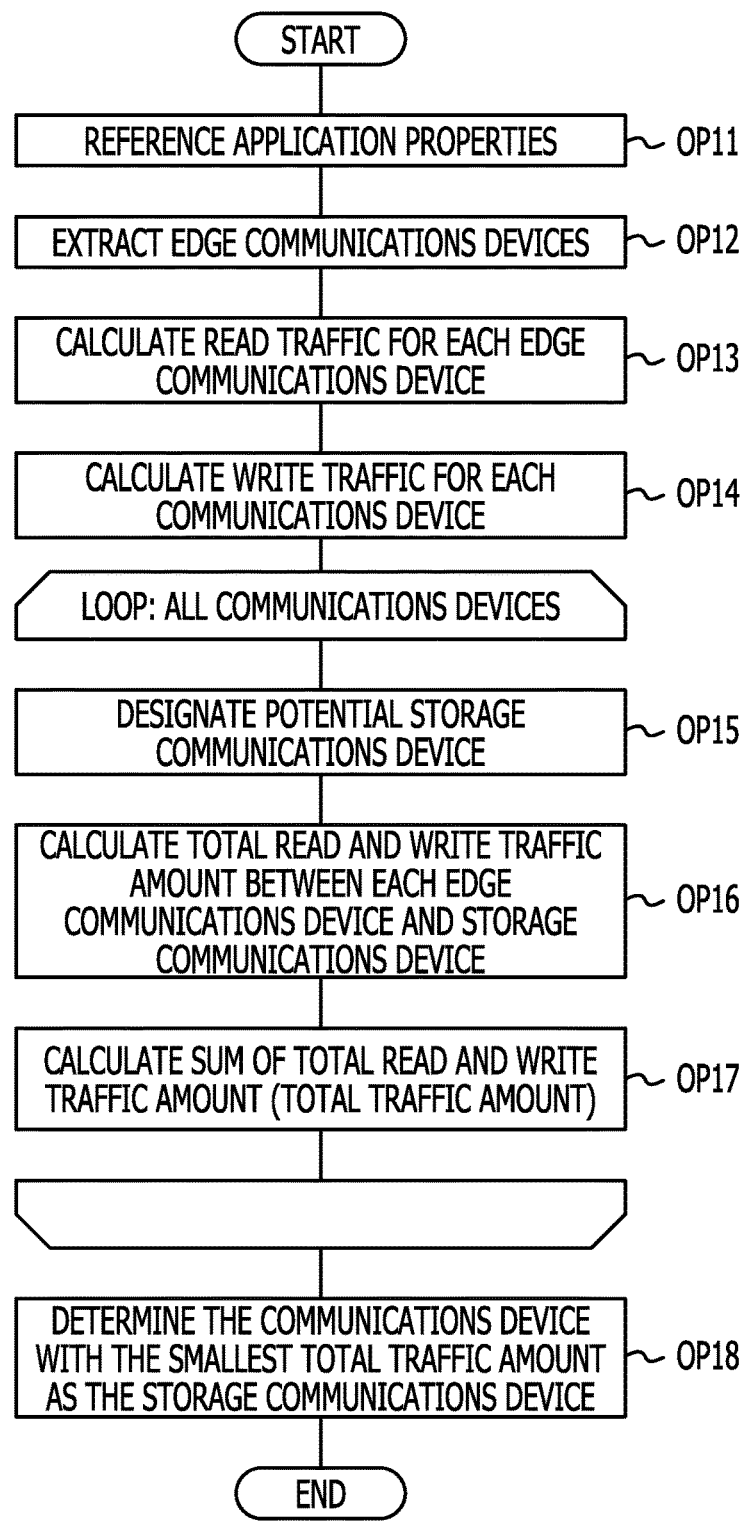
FIG. 18 is a diagram illustrating an example flowchart of a processing to determine the data storage location performed by a control device according to the second embodiment.

FIG. 18 is a diagram illustrating an example flowchart of a processing to determine the data storage location performed by a control device C1 according to the second embodiment. The processing in the flowchart illustrated in FIG. 18 is started by operational input received directly or remotely from the administrator of the communication system 100 at periodic intervals, for example.

At an OP11, the processor 101 references the application property information. At an OP12, the processor 101 extracts the edge communications device based on the application property information. At an OP13, the processor 101 calculates the read traffic amount generated between each application and each edge communications device. At an OP14, the processor 101 calculates the write traffic amount generated between each application and each edge communications device.

At an OP15, the processor 101 designates one of the communications devices A1 through A8 in the communication system 100 as the candidate communications device to store the data D1. At an OP16, the processor 101 calculates the read traffic amount and the write traffic amount generated between the storage communications device and each edge communications device, and calculates the totals of each. At an OP17, the processor 101 calculates the total traffic amount generated on the network as the sum of the total read traffic amount and the total write traffic amount. The processing at the OP15 through OP17 is repeatedly executed for all communications devices present in the communication system 100.

At an OP18, the processor 101 determines the storage communications device as the communications device with the smallest total traffic amount. Afterwards, the processing illustrated in FIG. 18 terminates.

Further, the processing to determine the data storage location illustrated in FIG. 18 is repeatedly executed for each data type when there are multiple data types present.

The processing at the OP13 corresponds to the processing by the read traffic amount calculating unit 21. The processing at the OP14 corresponds to the processing by the write traffic amount calculating unit 22. The processing at the OP11, OP12, OP15, and OP16 related to the read traffic corresponds to the processing by the read traffic amount calculating unit 21. The processing at the OP11, OP12, OP15, and OP16 related to the write traffic corresponds to the processing by the write traffic amount calculating unit 22. The processing at the OP17 corresponds to the processing by the total traffic amount calculating unit 23. The processing at the OP18 corresponds to the processing by the determining unit 3. Further, when there are no applications to send read requests or applications that send write requests present in the communication system 100, the processing related to either the reads or writes is not performed when that type of application is not present. Also, the execution order of the OP13 and OP14 may be reversed.

Specific Example of the Second Embodiment

Figure 19:
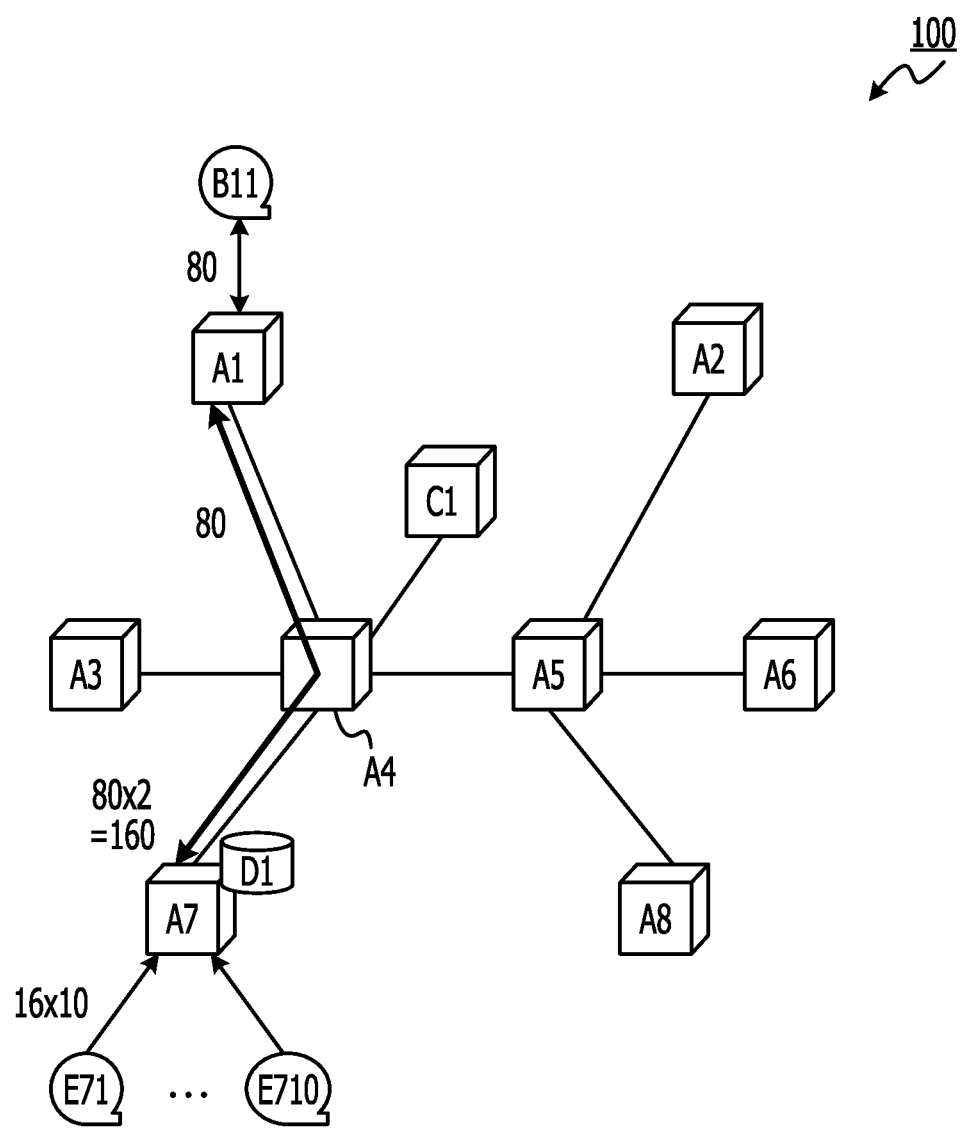
FIG. 19 is a specific example of the communication system.

FIG. 19 is a specific example of the communication system 100. According to the communication system 100 illustrated in FIG. 19, the read application B11 is contained in the communications device A1, and 10 write applications E71 through E710 are contained in the communications device A7. FIG. 20 is an example of the application property information regarding the communication system 100 illustrated in FIG. 19. The read traffic amount between the read application B11 and the edge communications device A1 is 80 kbps as a result of 100 kb per read eight times at a rate of 0.1 times per second. The write traffic amount between each write application E71 through E710 and the communications device A7 is 16 kbps as a result of 20 kb per write eight times at a rate of 0.1 times per second.

The total traffic amount generated on the network for each of the communications devices A1 through A8 when designated as the candidate communications device to store the data D1 regarding the communication system 100 illustrated in FIG. 19 is listed below. FIG. 19 is a diagram illustrating an example of traffic when the communications device A7 is designated as the candidate communications device to store the data D1.

Communications device A1: 80×0+(16×10)×2=320 kbps
Communications device A2: 80×3+(16×10)×3=720 kbps
Communications device A3: 80×2+(16×10)×2=480 kbps
Communications device A4: 80×1+(16×10)×1=240 kbps
Communications device A5: 80×2+(16×10)×2=480 kbps
Communications device A6: 80×3+(16×10)×3=720 kbps
Communications device A7: 80×2+(16×10)×0=160 kbps
Communications device A8: 80×3+(16×10)×3=720 kbps Therefore, the communications device A7 is designated as the candidate communications device to store the data D1 according to the communication system 100 illustrated in FIG. 19, as it has the lowest total traffic amount.

Operational Advantages of the Second Embodiment

According to the second embodiment, the control device C1 stores the application property information and the network configuration information, and calculates the total read traffic amount and the total write traffic amount generated on the network when designating the communications devices A1 through A8 as the candidate communications device to store the data D1 based on this information. The communications device which has the smallest sum of the total read traffic amount and total write traffic amount is selected as the communications device to store the data D1. As a result, the destination to store the data may be determined such that storage space is efficiently used in the network and the amount of traffic generated on the network is reduced by the consideration of the read properties and write properties of each application.

Third Embodiment

According to a third embodiment, restrictions for the delay time of read and write requests are considered as one property of the applications, and edge communications devices in which the delay time has reached an upper limit value are excluded as candidate storage communications devices when designating candidate communications devices to store the data. The descriptions according to the third embodiment that are shared with the first embodiment and the second embodiment will be omitted.

Figure 21:
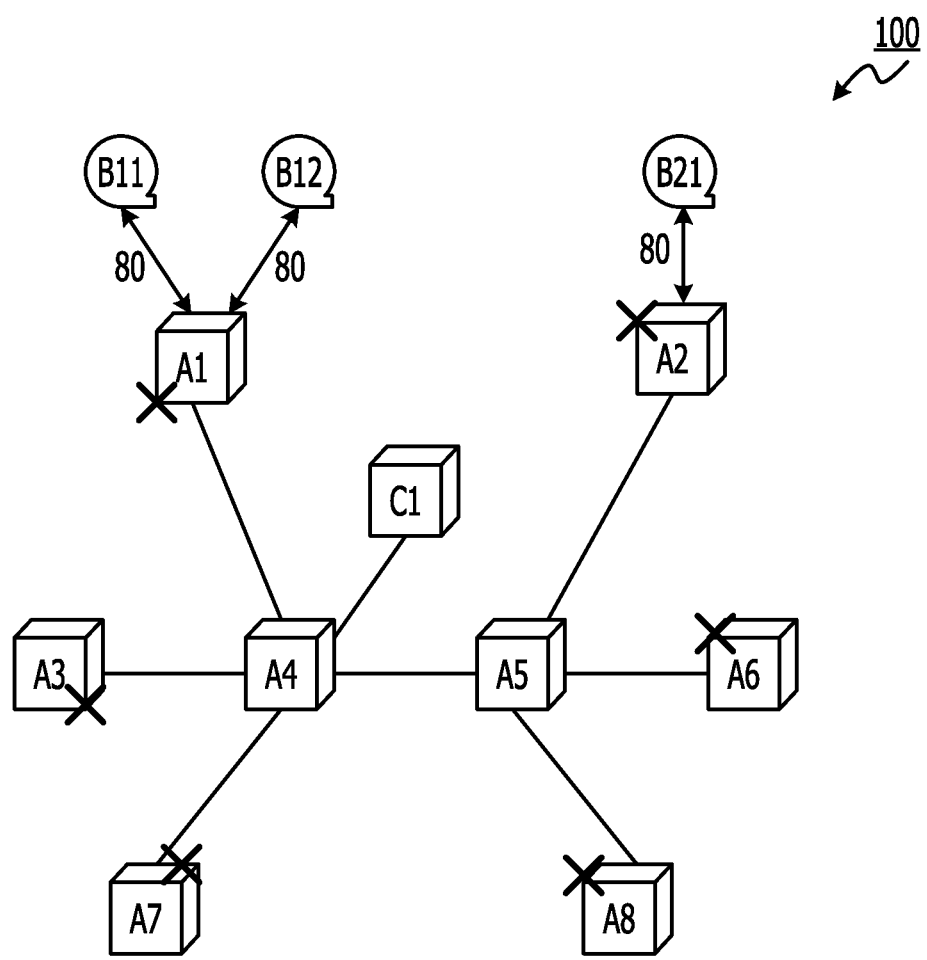
FIG. 21 is a diagram illustrating a communication system according to a third embodiment.

FIG. 21 is a diagram illustrating the communication system 100 according to the third embodiment. The communication system 100 regarding the third embodiment is the same as that regarding the first embodiment. The read applications B11, B12, and B21 sending read requests corresponding to the data are included in the communication system 100. The read applications B11 and B12 are contained in the communications device A1. The read application B21 is contained in the communications device A2. According to the third embodiment, the hardware configuration and functional blocks of the control device C1 are the same as that regarding the first embodiment.

FIG. 21 illustrates an example of traffic when the communications device A1 is designated as the candidate communications device to store the data D1. In this case, the read applications B11 and B12 do not extend to other communications devices and may read the data D1 from the communications device A1. Conversely, requests from the application B21 travel a path through the communications device A2, the communications device A5, and the communications device A4 to read the data D1 from the communications device A1.

Depending on the delay time from when the application B21 transmits the read request to the reception of the data D1 in response to the read request, the read request may timeout, and the read request corresponding to the data D1 may fail. The read request timeout may readily occur when the timeout value for the application is short, when the scale of the network is large in which the communication system includes multiple communications devices, and when the physical links between communications devices are long.

When using Transmission Control Protocol (TCP), for example, retransmissions due to read request timeouts may cause increases in network traffic. Therefore, according to the third embodiment, edge communications devices in which the delay time for accessing the data exceeds the upper limit value are excluded as candidates for the storage communications device when designating candidate storage communications devices in order to keep read and write requests away from timing out.

Regarding the example illustrated in FIG. 21, the read applications B11, B12, and B21 are assumed to include a property in which the read request timeout occurs when the number of hops is three or more. That is to say, the upper limit value of the delay time for read and write requests from the read applications B11, B12, and B21 is two hops. Further, the application property information illustrated in FIG. 4 is designated as the read properties for the read applications B11, B12, B21.

Regarding the example illustrated in FIG. 21, the communications devices that are at least three hops away from the edge communications device A1 regarding the read applications B11 and B12 are the communications devices A2, A6, and A8. The communications devices that are at least three hops away from the communications device A2 regarding the read application B21 are the communications devices A1, A3, A7, and A8. Therefore, the communications devices A1, A2, A3, A6, A7, and A8 are excluded as candidates for the communications device to store the data D1 as there is a high candidate for read requests to timeout.

According to the third embodiment, the read traffic amount calculating unit 21, the write traffic amount calculating unit 22, and the total traffic amount calculating unit 23 in the control device C1 calculate the total traffic amount generated on the network when designating the remaining communications devices A4 and A5 as the candidate communications device to store the data D1.

Figure 22:
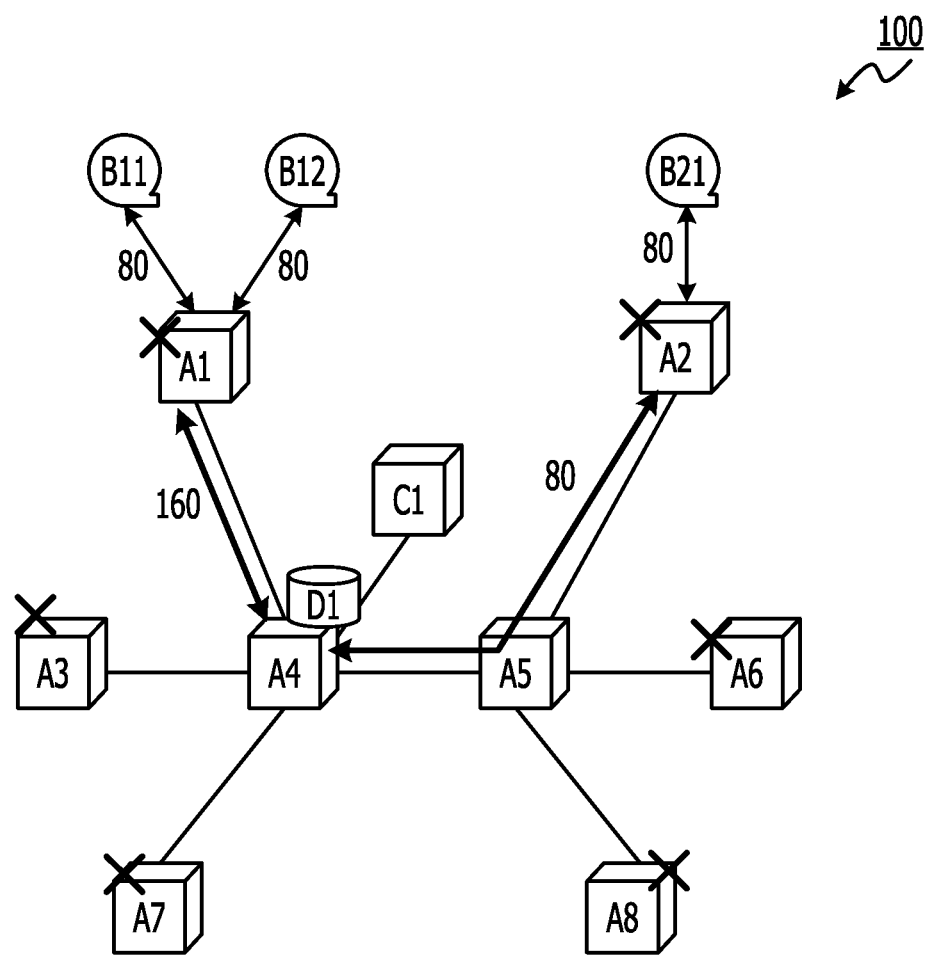
FIG. 22 is an example of traffic when the communications device is designated as the candidate storage destination for the data.

FIG. 22 is an example of traffic when the communications device A4 is designated as the candidate storage destination for the data D1 regarding the communication system 100 illustrated in FIG. 21. The total traffic amount generated on the network when the communications device A4 is designated as the candidate communications device to store the data D1 is 320 kbps as the result of ((80+80)×1+80×2). Conversely, the total traffic amount generated on the network when the communications device A5 is designated as the candidate communications device to store the data D1 is 400 kbps as the result of ((80+80)×2+80×1). Therefore, the communications device A4 is determined as the communications device to store the data D1.

FIG. 23 is a diagram illustrating an example of application property information according to the third embodiment. The application property information illustrated in FIG. 23 corresponds to the communication system 100 illustrated in FIG. 21. According to the third embodiment, the upper limit value of the delay time is added as one read property and write property. Further, the definition of the upper limit value of the delay time as the number of hops as in FIG. 23 is not limited thusly. The upper limit of the delay time may be defined by a delay time calculated based on the physical distance between each communications device and the link speeds, or may be defined by the delay time measured between the communication devices by a ping or similar. The upper limit value of the delay time may also be defined as a uniform value for all data types, or may be defined as different values for each data type or application. When the upper limit value of the delay time is different for each data type or application, the upper limit value of the delay time may be defined uniformly as the strictest value.

Further, the delay time regarding the read requests from the read applications are considered to determine the storage communications device in FIG. 21 through FIG. 23, but this is not limited thusly. Restrictions on delay times for both read and write requests may be considered when applications are present to send read requests and write requests in the communication system 100.

Process Flow

Figure 24:
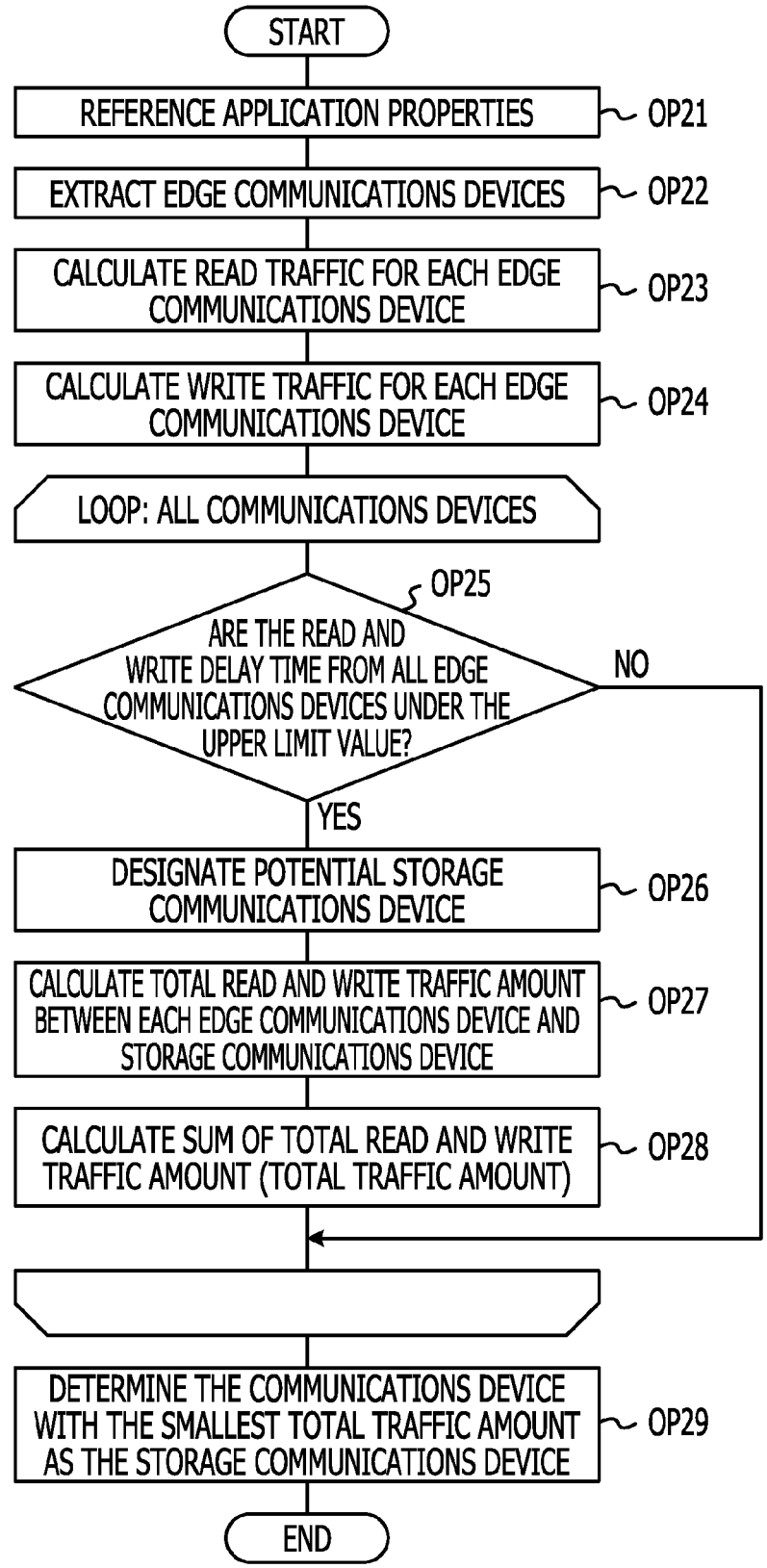
FIG. 24 is a diagram illustrating an example flowchart of a processing to determine the data storage location performed by a control device according to the third embodiment.

FIG. 24 is a diagram illustrating an example flowchart of a processing to determine the data storage location performed by the control device C1 according to the third embodiment. The processing in the flowchart illustrated in FIG. 24 is started by operational input received directly or remotely from the administrator of the communication system 100 at periodic intervals, for example.

At an OP21, the processor 101 references the application property information. At an OP22, the processor 101 extracts the edge communications device based on the application property information. At an OP23, the processor 101 calculates the read traffic amount generated between each application and each edge communications device. At an OP24, the processor 101 calculates the write traffic amount generated between each application and each edge communications device. The processing next proceeds to an OP25.

The processing from the OP25 through an OP28 is executed for all communications devices in the communication system. At the OP25, the processor 101 determines whether or not the delay time corresponding to either the read or write request from all edge communications devices is below the upper limit value for the current communications device under investigation. When the delay time corresponding to the read or write request from all edge communications devices to the current communications device under investigation is below the upper limit value (Yes in OP25), the processing proceeds to an OP26. When there is even one edge communications device in which the delay time corresponding to either the read or write request is more than the upper limit value for the current communications device under investigation (No in OP25), the processing switches to the next communications device, or the processing proceeds to an OP29. The processing proceeds to the OP29 when the processing from the OP25 through the OP28 has completed for all communications devices.

At the OP26, the processor 101 designates the current communication device under investigation as the candidate communications device to store the data D1. At an OP27, the processor 101 calculates the read traffic amount and the write traffic amount generated between each edge communications device and the storage communications device, and calculates the total amounts for both. At the OP28, the processor 101 calculates the total traffic amount generated on the network as the sum of the total read traffic amount and the total write traffic amount. Afterwards, the processing switches to the next communications device, or proceeds to the OP29.

At the OP29, the processor 101 determines the storage communications device as the communications device with the smallest total traffic amount. Afterwards, the processing illustrated in FIG. 24 terminates.

Further, the processing to determine the data storage location illustrated in FIG. 24 is repeatedly executed for each data type when there are multiple data types present.

The processing at the OP23 corresponds to the processing by the read traffic amount calculating unit 21. The processing at the OP24 corresponds to the processing by the write traffic amount calculating unit 22. The processing at the OP21, OP22, and OP25 through OP27 related to the read traffic corresponds to the processing by the read traffic amount calculating unit 21. The processing at the OP21, OP22, and OP25 through OP27 related to the write traffic corresponds to the processing by the write traffic amount calculating unit 22. The processing at the OP28 corresponds to the processing by the total traffic amount calculating unit 23. The processing at the OP29 corresponds to the processing by the determining unit 3. Further, when there are no applications to send read requests or applications that send write requests present in the communication system 100, the processing related to either reads or writes is not performed when that type of application is not present.

Operational Advantages of the Third Embodiment

According to the third embodiment, the control device C1 filters the candidate communications devices to store the data D1 considering the restrictions on the delay time corresponding to read requests and write requests. For example, when the restrictions on delay time corresponding to the read requests are not considered for the communication system 100 illustrated in FIG. 21, the communications device A1 with a total traffic amount of 240 kbps is determined as the communications device to store the data D1. By considering the restrictions on the delay time corresponding to the read requests, the communications device A1 is excluded as a candidate storage communications device in the communication system 100 illustrated in FIG. 21, and the communications device A4 becomes the communications device to store the data D1 (total traffic amount of 320 kbps). Therefore, though the total traffic amount may increase by considering the restrictions on the delay time corresponding to the read requests and the write requests, the occurrence of timeouts corresponding to the read requests and the write requests from the applications may be suppressed. By suppressing the occurrence of timeouts corresponding to the read requests and the write requests, retransmissions of the read requests and the write requests are reduced, and the increase in traffic due to the retransmission of the read requests and the write requests may be suppressed.

Therefore, according to the third embodiment, the occurrence of timeouts corresponding to the read requests and the write requests are suppressed, and the destination to store the data may be determined such that storage space is efficiently used in the network and the amount of traffic generated on the communication system is reduced.

Fourth Embodiment

According to a fourth embodiment, restrictions for the delay time of read and write requests are considered as one property of the applications to filter candidate communications devices to store the data, similar to the third embodiment. According to the fourth embodiment, when all communications devices in the communication system are excluded as candidates for the communications device to store the data due to the restrictions on the delay time being too strict, the number of communications device to store the data are increased. The descriptions according to the fourth embodiment that are shared with the first embodiment through the third embodiment will be omitted.

FIGS. 25, 26, 27, and 28 are diagrams illustrating the communication system 100 according to the fourth embodiment. The communication system 100 regarding the fourth embodiment is the same as that regarding the first embodiment. The read applications B11, B21, B31 and B61 sending read requests are included in the communication system 100. The read application B11 is contained in the communications device A1. The read application B21 is contained in the communications device A2. The read application B31 is contained in the communications device A3. The read application B61 is contained in the communications device A6. According to the fourth embodiment, the hardware configuration and functional blocks of the control device C1 are the same as that regarding the first embodiment.

Figure 25:
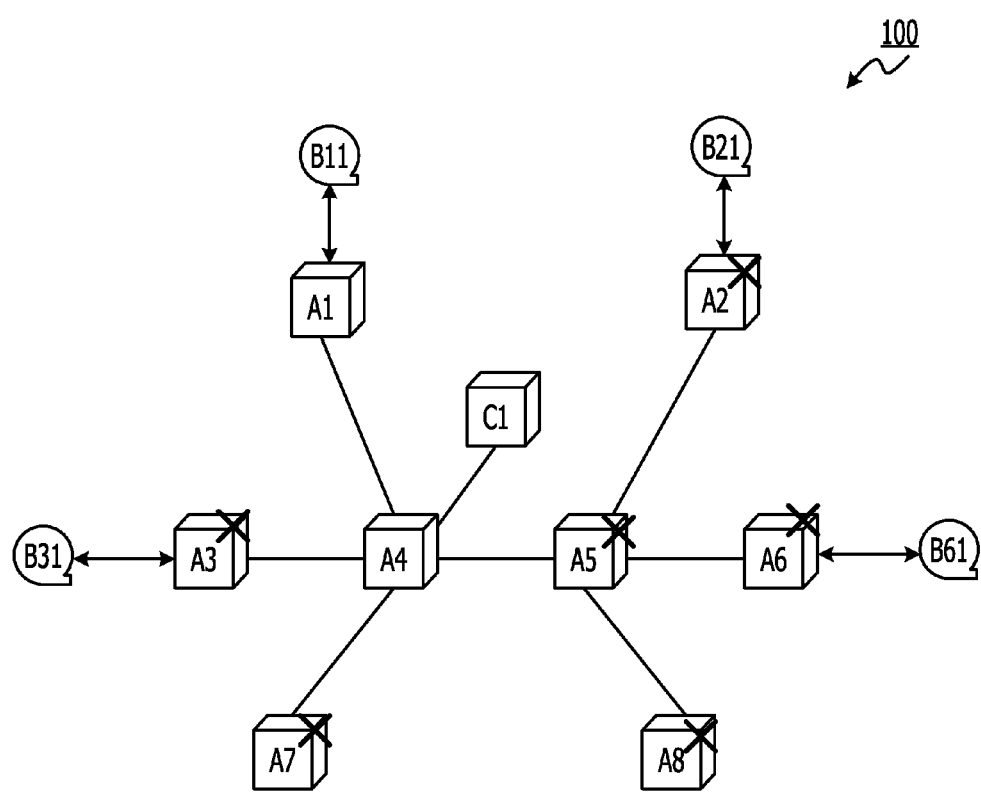
FIG. 25 is a diagram illustrating a communications device in which the delay time from an edge communications device is not over an upper limit value, and a communications device in which the upper limit value has been reached.

According to the communication system 100 illustrated in FIGS. 25, 26, 27, and 28, the upper limit value of the delay time for each read application B11, B21, B31, and B61 is one hop FIG. 25 is a diagram illustrating a communications device in which the delay time from an edge communications device A1 is not over an upper limit value, and a communications device in which the upper limit value has been reached. As the upper limit value of the delay time for the read application B11 is one hop, the communications device in which the delay time from the edge communications device A1 is not over the upper limit value is the communications device A4. The communications devices in which the delay time from the edge communications device A1 is over the upper limit value are the communications devices A2, A3, A5, A6, A7, and A8. Therefore, all communications devices except for the communications device A1 and the communications device A4 are excluded as candidate communications devices to store the data D1 for the read application B11.

Figure 26:
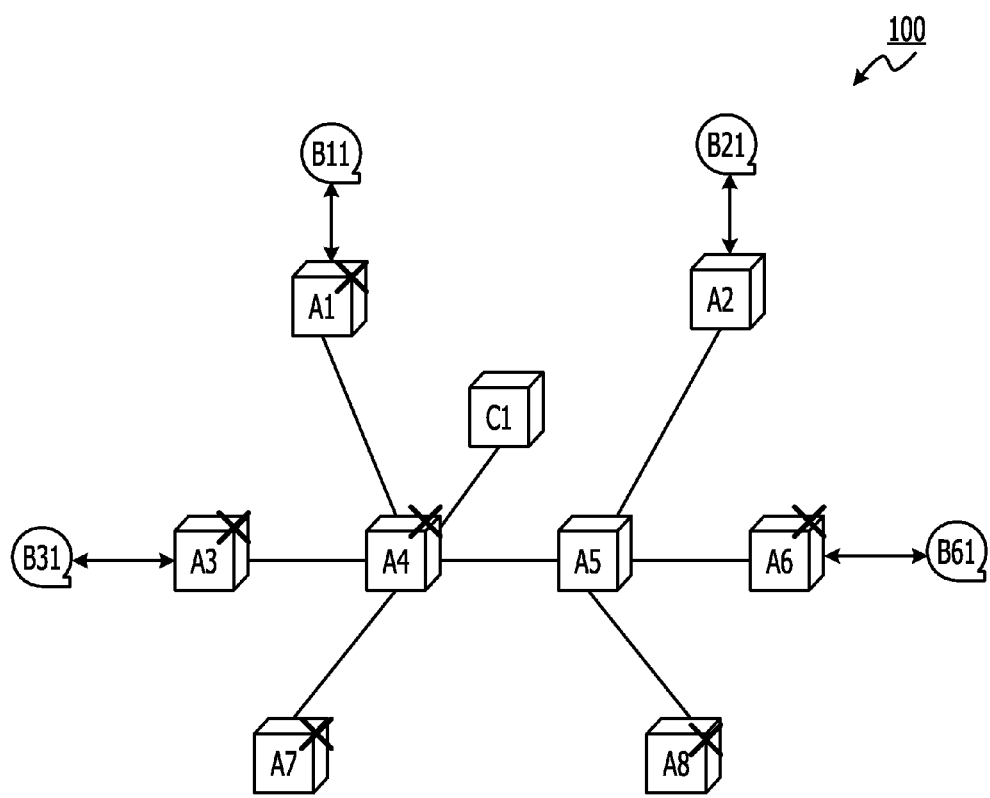
FIG. 26 is a diagram illustrating a communications device in which the delay time from an edge communications device is not over an upper limit value, and a communications device in which the upper limit value has been reached.

FIG. 26 is a diagram illustrating a communications device in which the delay time from an edge communications device A2 is not over an upper limit value, and a communications device in which the upper limit value has been reached. As the upper limit value of the delay time for the read application B21 is one hop, the communications device in which the delay time from the edge communications device A2 is not over the upper limit value is the communications device A5. The communications devices in which the delay time from the edge communications device A2 is over the upper limit value are the communications devices A1, A3, A4, A6, A7, and A8. Therefore, all communications devices except for the communications device A2 and the communications device A5 are excluded as candidate communications devices to store the data D1 for the read application B21.

Figure 27:
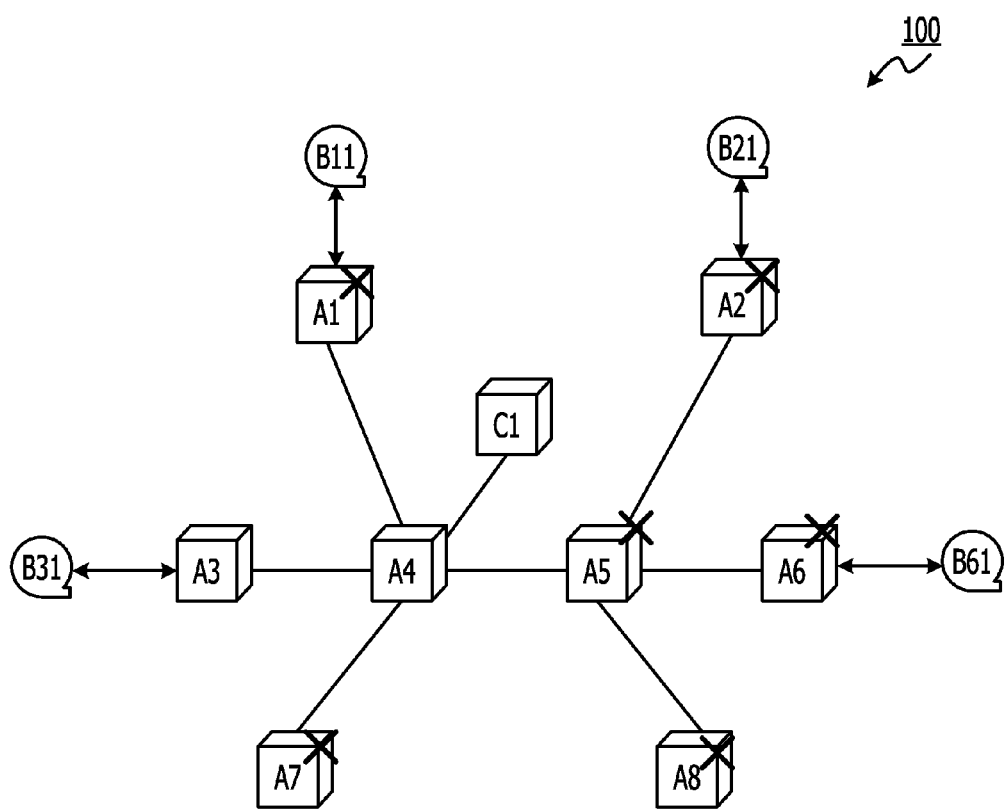
FIG. 27 is a diagram illustrating a communications device in which the delay time from an edge communications device is not over an upper limit value, and a communications device in which the upper limit value has been reached.

FIG. 27 is a diagram illustrating a communications device in which the delay time from an edge communications device A3 is not over an upper limit value, and a communications device in which the upper limit value has been reached. As the upper limit value of the delay time for the read application B31 is one hop, the communications device in which the delay time from the edge communications device A3 is not over the upper limit value is the communications device A4. The communications devices in which the delay time from the edge communications device A3 is over the upper limit value are the communications devices A1, A2, A5, A6, A7, and A8. Therefore, all communications devices except for the communications device A3 and the communications device A4 are excluded as candidate communications devices to store the data D1 for the read application B31.

Figure 28:
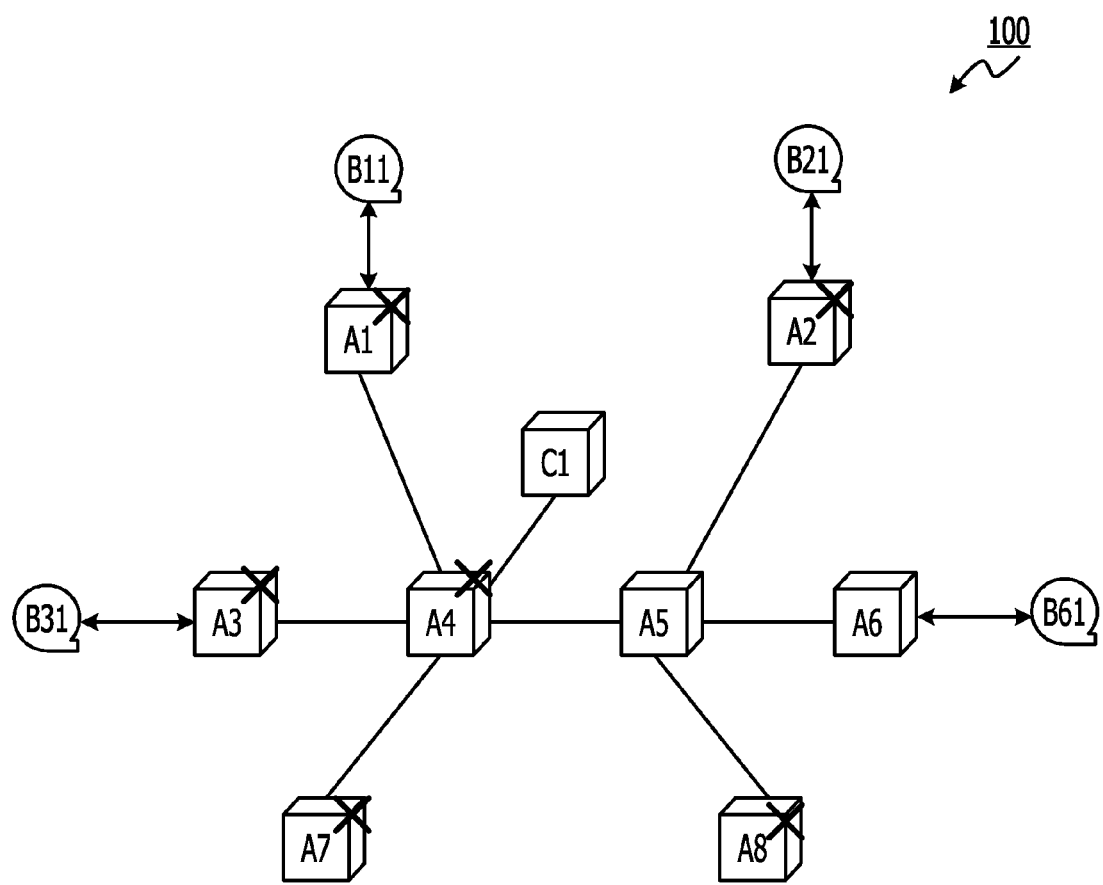
FIG. 28 is a diagram illustrating a communications device in which the delay time from an edge communications device is not over an upper limit value, and a communications device in which the upper limit value has been reached.

FIG. 28 is a diagram illustrating a communications device in which the delay time from an edge communications device A6 is not over an upper limit value, and a communications device in which the upper limit value has been reached. As the upper limit value of the delay time for the read application B61 is one hop, the communications device in which the delay time from the edge communications device A6 is not over the upper limit value is the communications device A5. The communications devices in which the delay time from the edge communications device A6 is over the upper limit value are the communications devices A1, A2, A3, A4, A7, and A8. Therefore, all communications devices except for the communications device A6 and the communications device A5 are excluded as candidate communications devices to store the data D1 for the read application B11.

Regarding the upper limit restrictions of one hop as the delay time for each read application B11, B21, B31, and B61 in FIG. 25 through FIG. 28, there are no communications devices satisfying the restriction of an upper limit value of one hop as the delay time for all applications in the communication system 100. For this reason, there are no communications devices which may become candidate communications devices to store the data D1 in the communication system 100, and so one common storage communications device may not be determined.

According to the fourth embodiment, the control device C1 increases the number of storage communications devices and determines multiple storage communications devices when there are no communications devices in the communication system 100 in which the delay time is not over the upper limit value for all applications.

Figure 29:
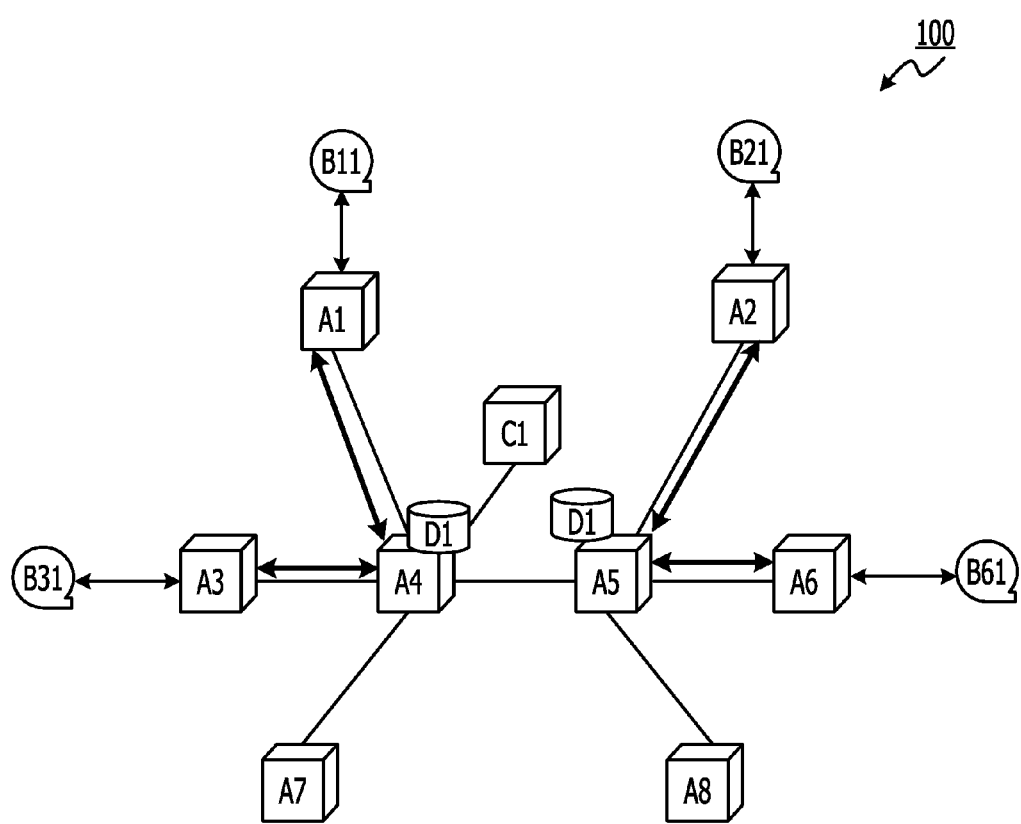
FIG. 29 is a diagram illustrating an example of traffic when the data is stored in two storage communications devices.

FIG. 29 is a diagram illustrating an example of traffic when the data D1 is stored in two storage communications devices. FIG. 29 illustrates an example in which the data D1 is copied, and two communications devices, the communications device A4 and the communications device A5, are designated as candidate communications devices to store the data D1 when the upper limit value of the delay time for each application is one hop.

The control device C1 increases the number of storage communications devices by one, from one device to two devices, when there are no communications devices in which the delay time for all applications is within the restrictions in the communication system 100 as illustrated in FIG. 25 through FIG. 28. The control device C1 sequentially determines whether or not any combination of two communications devices satisfies the restrictions on the delay time for all applications. When the restrictions on the delay time for all applications is satisfied, the control device C1 designates the combination of the two communications devices as candidate storage communications devices, calculates the total traffic amount, and determines the combination of communications devices with the smallest total traffic amount as the communications device to store the data D1.

When there are no combinations of communications devices satisfying the restrictions on the delay time for all applications regarding the group of all combinations of two communications devices, the control device C1 further increases the number of storage communications devices by one. The control device C1 performs the processing described beforehand for combinations of three communications devices.

Further, FIG. 25 through FIG. 29 illustrated applications sending read requests, but the combinations of storage communications devices may be determined in the same way when there are applications sending write requests or when there is a mixture of applications sending read requests and applications sending write requests. In this case, the control device C1 calculates the total write traffic amount when candidate storage communications devices are designated regarding combinations of storage communications devices, the total traffic amount is obtained, and the combination of storage communications devices with the smallest total traffic amount is determined.

Further, when there are multiple storage communications devices, applications sending write requests, for example, may generate data write requests to be sent to each storage communications device. The applications sending write requests, for example, may also send write requests to one storage communications device, and the written data may be copied between the storage communications devices to ensure consistency in the data.

Process Flow

Figure 30A:
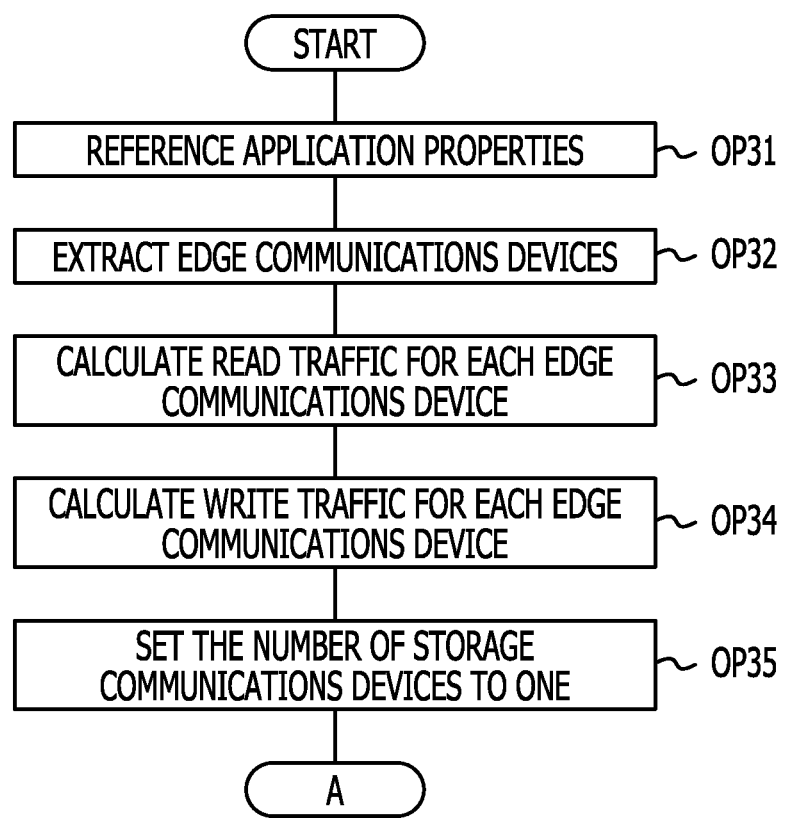
FIG. 30A is a diagram illustrating an example flowchart of a processing to determine the data storage location performed by a control device according to a fourth embodiment.
Figure 30B:
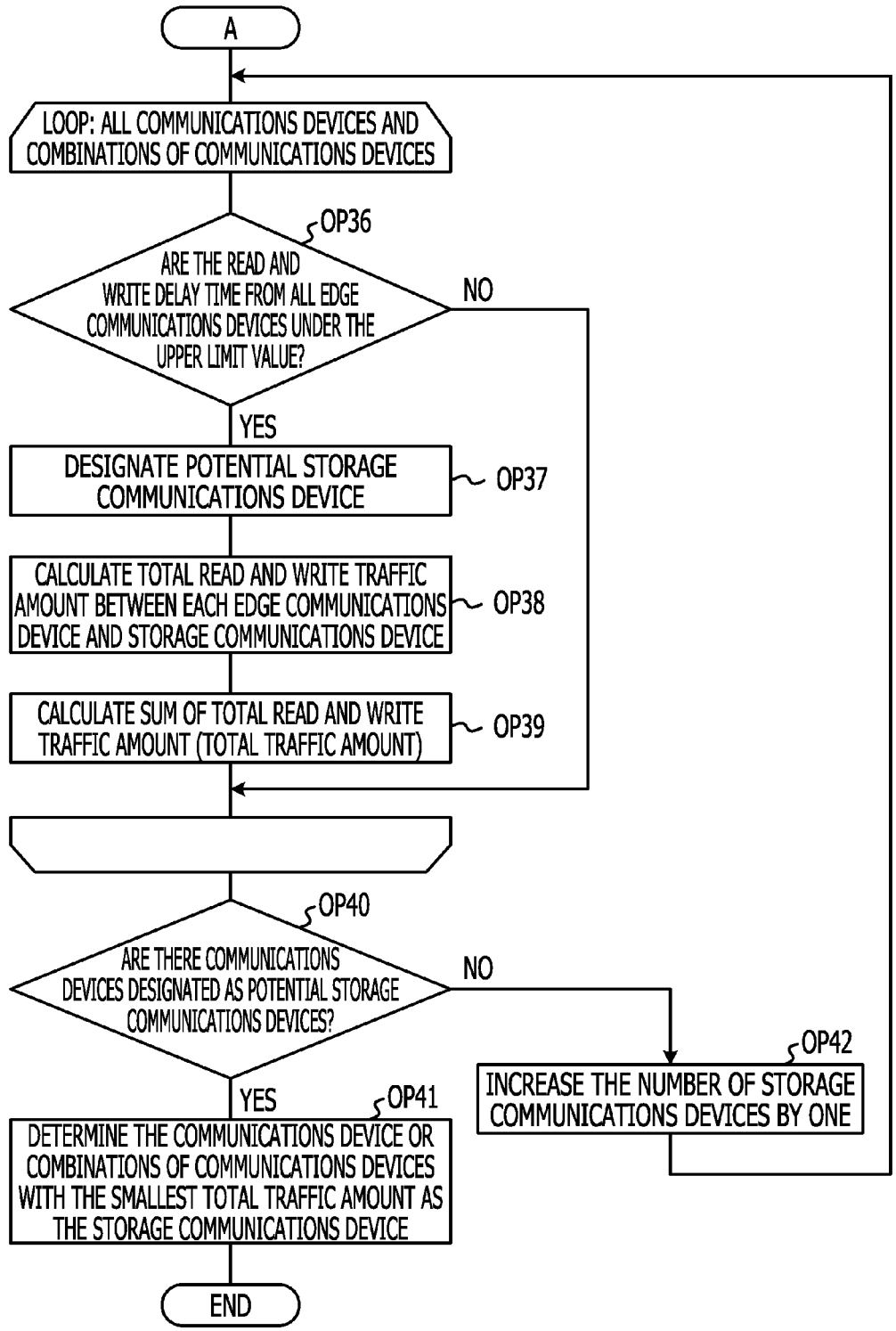
FIG. 30B is a diagram illustrating an example flowchart of a processing to determine the data storage location performed by a control device according to the fourth embodiment.

FIGS. 30A and 30B are diagrams illustrating an example flowchart of a processing to determine the data storage location performed by the control device C1 according to the fourth embodiment. The processing in the flowchart illustrated in FIGS. 30A and 30B is started by operational input received directly or remotely from the administrator of the communication system 100 at periodic intervals, for example.

At an OP31, the processor 101 references the application property information. At an OP32, the processor 101 extracts the edge communications device based on the application property information. At an OP33, the processor 101 calculates the read traffic amount generated between each application and each edge communications device. At an OP34, the processor 101 calculates the write traffic amount generated between each application and each edge communications device.

At an OP35, the processor 101 sets the number of storage communications devices to one. The initial value of the number of storage communications devices is one. The processing next proceeds to an OP36.

The processing from the OP36 through an OP39 is executed for all communications devices and all combinations of communications devices in the communication system. At the OP36, the processor 101 determines whether or not the delay time corresponding to either the read or write request from all edge communications devices is below the upper limit value for the current communications device or combination of communications devices under investigation. When the delay time corresponding to the read or write request from all edge communications devices to the current communications device or combination of communications devices under investigation is below the upper limit value (Yes in OP36), the processing proceeds to an OP37. When there is even one edge communications device in which the delay time corresponding to either the read or write request is more than the upper limit value for the current communications device or combination of communications devices under investigation (No in OP36), the processing switches to the next communications device or combination of communications devices, or the processing proceeds to an OP40. The processing proceeds to the OP40 when the processing from the OP36 through the OP39 has completed for all communications devices and combinations of communications devices.

At the OP37, the processor 101 designates the current communications device or combination of communications devices under investigation as the candidate communications device to store the data D1. At an OP38, the processor 101 calculates the read traffic amount and the write traffic amount generated between each edge communications device and the storage communications device, and calculates the total amounts for both. At the OP39, the processor 101 calculates the total traffic amount generated on the network as the sum of the total read traffic amount and the total write traffic amount. Afterwards, the processing switches to the next communications device, or proceeds to the OP40.

At the OP40, the processor 101 determines whether or not there are any communications devices or combinations of communications devices that have been designated as candidate storage communications devices. That is to say, the processor 101 determines whether or not the total traffic amount has been calculated for any of the communications devices or combinations of communications devices. When there are communications devices or combinations of communications devices that have been designated as candidate storage communications devices (Yes in OP40), the processing proceeds to an OP41. When there are no communications devices or combinations of communications devices that have been designated as candidate storage communications devices (No in OP40), the processing proceeds to an OP42.

At the OP41, the processor 101 determines the storage communications device as the communications device or combination of communications devices with the smallest total traffic amount. Afterwards, the processing illustrated in FIGS. 30A and 30B terminates.

At the OP42, the processor 101 increases the number of storage communications devices by one as there are no communications devices or combinations of communications devices that have been designated as candidate storage communications devices. Afterwards, the processing from the OP36 through OP39 is performed for the combinations of communications devices regarding the increase in the number of communications devices by one.

Further, when there are multiple storage communications devices, and the applications send write requests to multiple storage communications devices, the total write traffic amount is calculated as the total amount of write traffic from each application to each storage communications device. When there are multiple storage communications devices, and the applications send read and write requests to the one closest storage communications device, the total read and write traffic amounts are each calculated as the sums from each application to the one closest storage communications device.

The processing at the OP33 corresponds to the processing by the read traffic amount calculating unit 21. The processing at the OP34 corresponds to the processing by the write traffic amount calculating unit 22. The processing at the OP31, OP32, and OP35 through OP38 related to the read traffic corresponds to the processing by the read traffic amount calculating unit 21. The processing at the OP31, OP32, and OP35 through OP38 related to the write traffic corresponds to the processing by the write traffic amount calculating unit 22. The processing at the OP39, OP40, and OP42 corresponds to the processing by the total traffic amount calculating unit 23. The processing at the OP41 corresponds to the processing by the determining unit 3.

Operational Advantages of the Fourth Embodiment

According to the fourth embodiment, the control device C1 increases the number of communications device to store the data when there are no communications devices satisfying the restrictions on the delay time corresponding to the read requests and the write requests. As a result, when the restrictions on the delay time of the read requests and the write requests from the applications are strict, the occurrence of timeouts corresponding to the read requests and the write requests from the applications may still be suppressed.

Therefore, according to the fourth embodiment, the occurrence of timeouts corresponding to the read requests and the write requests are suppressed, and the destination to store the data may be determined such that storage space is efficiently used in the entire communication system and the amount of traffic generated on the communication system is reduced.

Fifth Embodiment

According to a fifth embodiment, the data storage capacity is considered, and communications devices in which the data storage capacity usage ratio is over a threshold are excluded as candidate communications devices to store the data. The descriptions according to the fifth embodiment that are shared with the first embodiment through the fourth embodiment will be omitted.

Figure 31:
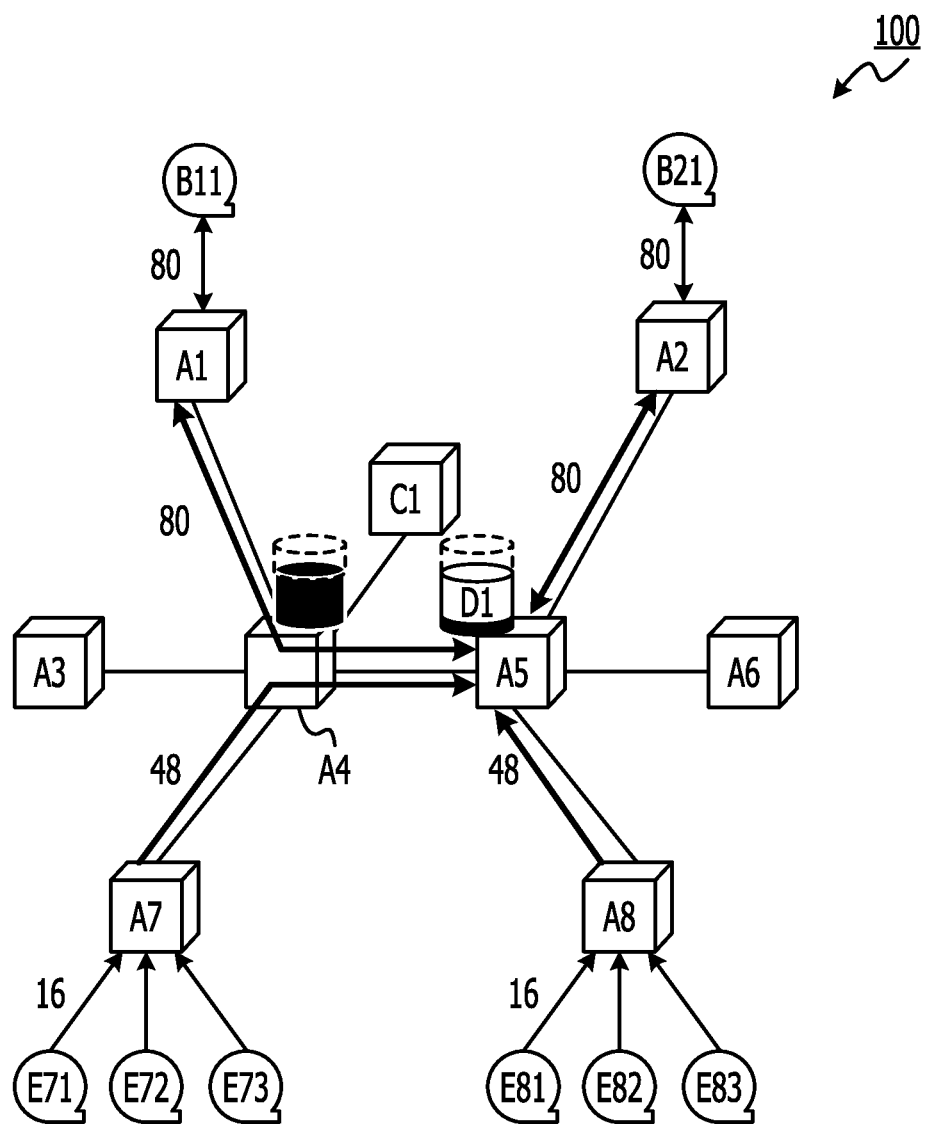
FIG. 31 is a diagram illustrating an example of a communication system.

FIG. 31 is a diagram illustrating an example of the communication system 100 according to the fifth embodiment. The communication system 100 regarding the fifth embodiment is the same as that regarding the first embodiment. The read applications B11 and B21 sending read requests are included in the communication system 100. The write applications E71, E72, E73, E81, E82, and E83 sending write requests are included in the communication system 100. The read application B11 is contained in the communications device A1. The read application B21 is contained in the communications device A2. The write applications E71, E72, and E73 are contained in the communications device A7. The write applications E81, E82, and E83 are contained in the communications device A8.

The communication system 100 illustrated in FIG. 31 is the same as the communication system 100 illustrated in FIG. 16. As described regarding FIG. 16, when the communications device A4 and A5 are designated as the candidate storage communications devices with the smallest total traffic amount in the communication system 100 illustrated in FIG. 31, the total traffic amount is 384 kbps.

Hereafter, there is an upper limit to the storage capacity for the storage provisioned to each of the communications devices A1 through A8.

The size of data to be stored in the communications devices increases, for example, when one communications device is designated as the communications device to store multiple types of data, or when one communications device is designated as the communications device to store the data for applications with large data sizes or with high data generation frequency. For this reason, as the storage capacity continues to be consumed, the remaining storage capacity decreases, and there is a candidate for failures in storing the data to occur due to lack of capacity, for example.

Thus, according to the fifth embodiment, the control device C1 derives the usage ratio of the data storage capacity for each communications device, and excludes communications devices in which the usage ratio is over a threshold as candidate storage communications devices in order to suppress the occurrence of failures to store the data.

The usage ratio of the data storage capacity for the communications device A4 is over the threshold, and the usage ratio of the data storage capacity for the communications device A5 is sufficiently smaller than that for the communications device A4 as illustrated in FIG. 31. The threshold for the usage ratio of the data storage capacity is 80%, for example. For this reason, the control device C1 excludes the communications device A4 as a candidate storage communications device after considering the usage ratio for the data storage capacity, and selects the communications device A5 as the storage communications device.

FIG. 32 is a diagram illustrating an example of a storage usage management table. The storage usage management table stores the usage ratio for the data storage capacity regarding the storage in the communications devices in the communication system 100, and is stored in the recording unit 1 in the control device C1. The usage ratio of the data storage capacity for the storage of each communications device is notified to the control device C1 from each communications device, for example, by the Simple Network Management Protocol (SNMP) or similar protocol at periodic intervals.

According to the example illustrated in FIG. 32, the ratio of used storage corresponding to the total data storage capacity for the storage in each communications device is stored in the storage usage management table as the storage usage ratio of each communications device. However, this is not limited thusly.

Process Flow

Figure 33:
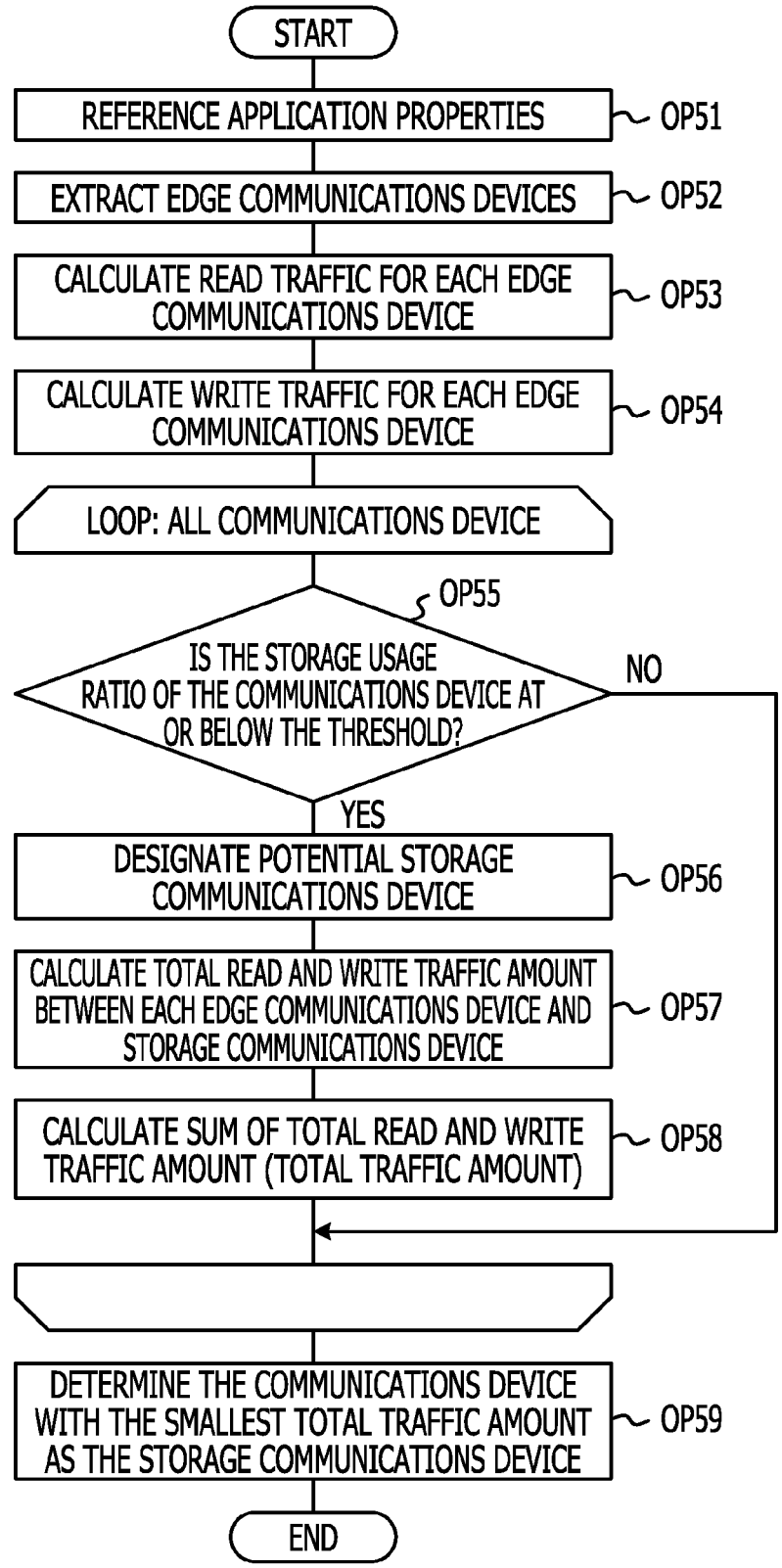
FIG. 33 is a diagram illustrating an example of a flowchart of a processing to determine the data storage location performed by a control device according to a fifth embodiment.

FIG. 33 is a diagram illustrating an example flowchart of a processing to determine the data storage location performed by the control device C1 according to the fifth embodiment. The processing in the flowchart illustrated in FIG. 33 is started by operational input received directly or remotely from the administrator of the communication system 100 at periodic intervals, for example.

At an OP51, the processor 101 references the application property information. At an OP52, the processor 101 extracts the edge communications device based on the application property information. At an OP53, the processor 101 calculates the read traffic amount generated between each application and each edge communications device. At an OP54, the processor 101 calculates the write traffic amount generated between each application and each edge communications device. The processing next proceeds to an OP55.

The processing from the OP55 through an OP58 is executed for all communications devices in the communication system. At the OP55, the processor 101 determines whether or not the usage ratio of the data storage capacity regarding the storage for the current communications device under investigation is at or below the threshold. When the usage ratio of the data storage capacity regarding the storage for the current communications device under investigation is at or below the threshold (Yes in OP55), the processing proceeds to an OP56. When the usage ratio of the data storage capacity regarding the storage for the current communications device under investigation is over the threshold (No in OP55), the processing switches to the next communications device, or the processing proceeds to an OP59. The processing proceeds to the OP59 when the processing from the OP55 through the OP58 has completed for all communications devices.

At the OP56, the processor 101 designates the current communications device under investigation as the candidate communications device to store the data D1. At an OP57, the processor 101 calculates the read traffic amount and the write traffic amount generated between each edge communications device and the storage communications device, and calculates the total amounts for both. At the OP58, the processor 101 calculates the total traffic amount generated on the network as the sum of the total read traffic amount and the total write traffic amount. Afterwards, the processing switches to the next communications device, or proceeds to the OP59.

At the OP59, the processor 101 determines the storage communications device as the communications device with the smallest total traffic amount. Afterwards, the processing illustrated in FIG. 33 terminates.

The processing at the OP53 corresponds to the processing by the read traffic amount calculating unit 21. The processing at the OP54 corresponds to the processing by the write traffic amount calculating unit 22. The processing at the OP51, OP52, and OP55 through OP57 related to the read traffic corresponds to the processing by the read traffic amount calculating unit 21. The processing at the OP51, OP52, and OP55 through OP57 related to the write traffic corresponds to the processing by the write traffic amount calculating unit 22. The processing at the OP58 corresponds to the processing by the total traffic amount calculating unit 23. The processing at the OP59 corresponds to the processing by the determining unit 3. Further, when there are no applications to send read requests or applications that send write requests present in the communication system 100, the processing related to either reads or writes is not performed when that type of application is not present.

Operational Advantages of the Fifth Embodiment

According to the fifth embodiment, the control device C1 filters candidate communications devices to store the data after considering the usage ratio of the data storage capacity regarding the storage in each communications device. As a result, the occurrence of failures to store the data due to the consumption of the data storage capacity may be reduced. By reducing the occurrence of failures to store the data regarding write requests, the retransmission of write requests may be reduced, for example, and the increase in traffic due to retransmission of write requests may be suppressed.

Therefore, according to the fifth embodiment, the occurrence of failures to store data are suppressed, and the communications device to store the data may be determined such that storage space is efficiently used throughout the entire communication system and the amount of traffic generated on the communication system is reduced. According to the fifth embodiment, the usage ratio of the storage was considered, but this is not limited to the usage ratio of the storage, and the control device C1 may consider the remaining storage capacity, for example, and select the communications devices in which the remaining storage capacity is over a threshold as the candidate communications device to store the data.

Sixth Embodiment

According to a sixth embodiment, the processing performance corresponding to read requests and write requests at each communications device is considered, and communications devices in which the processing performance is not sufficient regarding read requests and write requests are excluded as candidate communications devices to store the data. The descriptions according to the sixth embodiment that are shared with the first embodiment through the fifth embodiment will be omitted.

Figure 34:
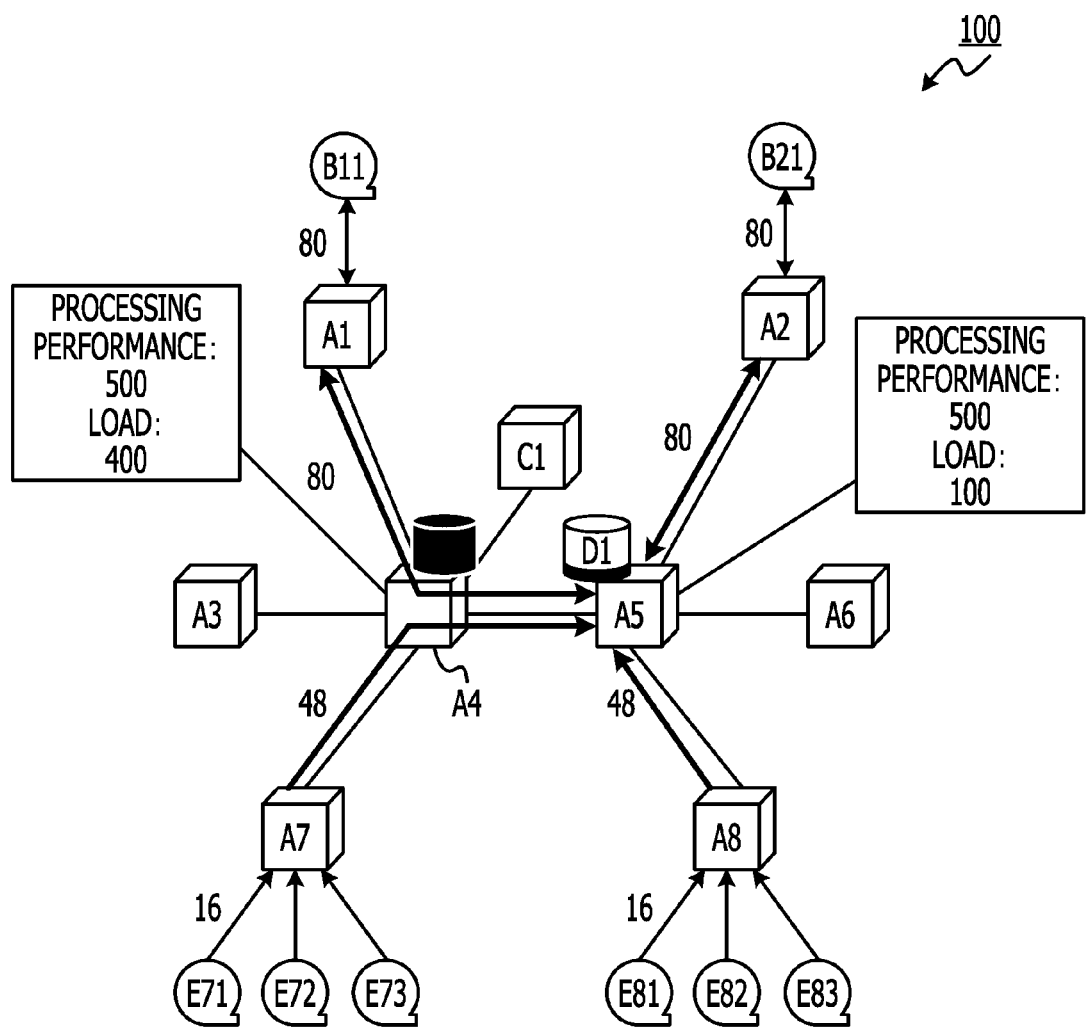
FIG. 34 is a diagram illustrating an example of a communication system.

FIG. 34 is a diagram illustrating the communication system 100 according to the sixth embodiment. The communication system 100 illustrated in FIG. 34 is the same as the communication system 100 illustrated in FIGS. 16 and 31. As described regarding FIG. 16, when the communications device A4 and A5 are designated as the candidate storage communications devices with the smallest total traffic amount in the communication system 100 illustrated in FIG. 34, the total traffic amount is 384 kbps.

For example, when read requests or write requests from the applications are concentrated, some of the data read requests or write requests might not be processed due to insufficient processing performance, depending on the processing performance of the communications device. When the communications device may not process read requests or write requests, there is a candidate that the read request or write request fails, and the network traffic amount increases due to retransmissions. Examples of the processing performance of the communications device include the CPU processing performance, the storage capacity, and others.

Thus, according to the sixth embodiment, the control device C1 derives the processing performance and load state for each communications device, and excludes communications devices in which the load is over a threshold as candidate storage communications devices in order to suppress the occurrence of read request and write request failures.

According to the example illustrated in FIG. 34, the communications device A4 represents multiple communications device to store the data in which data read requests and write requests are concentrated, and the load is over the threshold. The load threshold is 80% of the maximum processing performance, for example. The processing performance of the communications device A4 is 500, for example, and the current load is 400. This processing performance is calculated, for example, by a predetermined calculation from the values regarding the CPU processing performance, storage capacity, and others for the communications device. Also, load is calculated following a predetermined calculation expression, from values such as the usage rate of the CPU of the communication device, the usage rate of the storage capacity, and so forth. Conversely, the communications device A5 has a processing performance of 500, and the current load is 100, which is sufficiently smaller than that of the communications device A4. For this reason, the control device C1 excludes the communications device A4 as a candidate storage communications device after considering the total traffic amount generated by read requests and write requests, and the load state of the communications device, and then determines the communications device A5 as the storage communications device.

FIG. 35 is a diagram illustrating an example of a load state table. The load state table stores the load state for the storage in the communications devices in the communication system 100, and is stored in the recording unit 1 in the control device C1. The load state for each communications device is notified to the control device C1 from each communications device, for example, by SNMP or similar protocol at periodic intervals.

According to the example illustrated in FIG. 35, the ratio of the current processing performance corresponding to the maximum processing performance of each communications device is stored in the load state table. The load state of the communications device is derived from values calculated by a predetermined method from the CPU usage ratio and the storage capacity usage ratio, for example. However, this is not limited thusly.

Processing Flow

Figure 36:
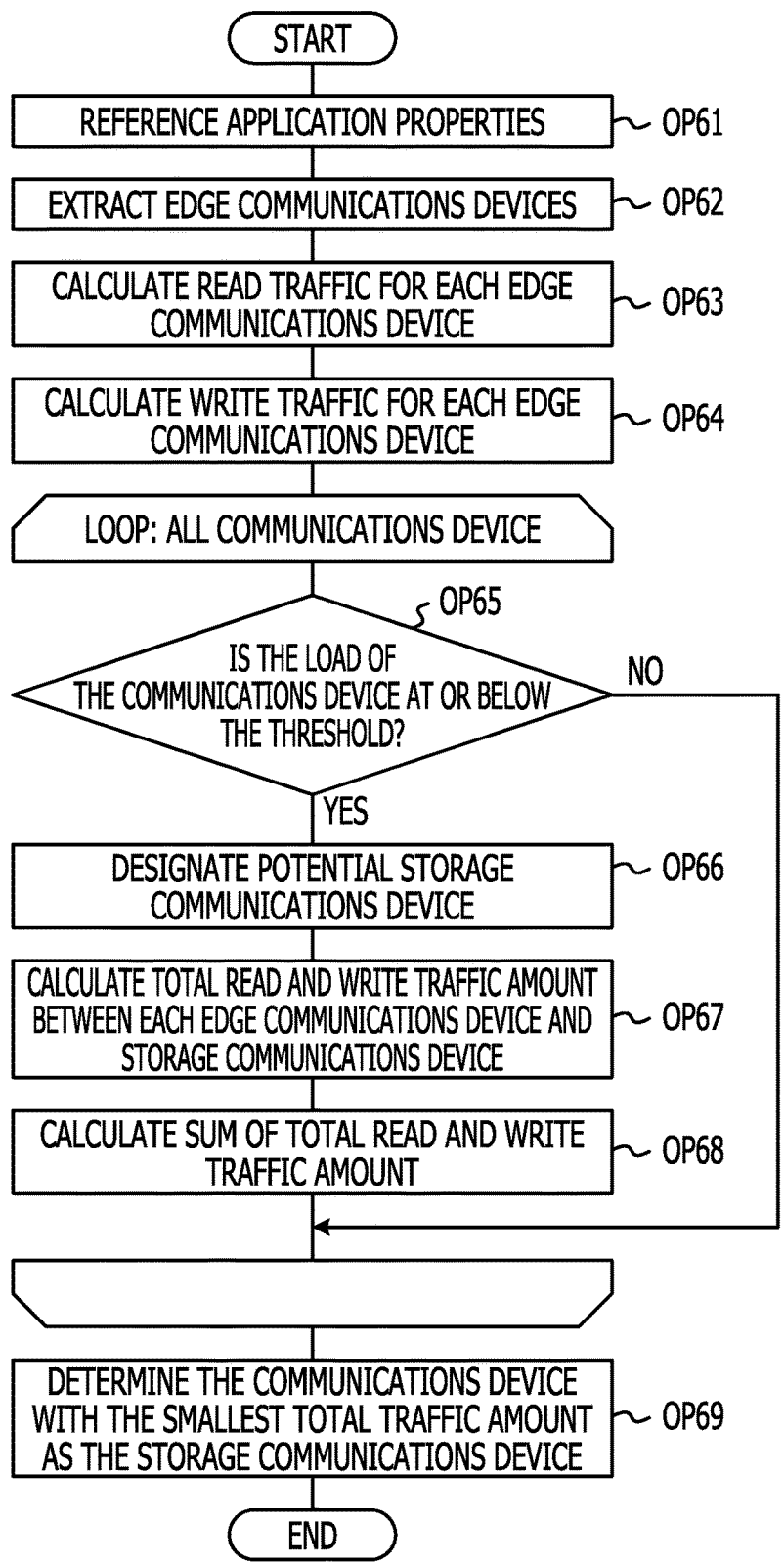
FIG. 36 is a diagram illustrating an example of a flowchart of a processing to determine the data storage location performed by a control device according to the sixth embodiment.

FIG. 36 is a diagram illustrating an example flowchart of a processing to determine the data storage location performed by the control device C1 according to the sixth embodiment. The processing in the flowchart illustrated in FIG. 36 is started by operational input received directly or remotely from the administrator of the communication system 100 at periodic intervals, for example.

At an OP61, the processor 101 references the application property information. At an OP62, the processor 101 extracts the edge communications device based on the application property information. At an OP63, the processor 101 calculates the read traffic amount generated between each application and each edge communications device. At an OP64, the processor 101 calculates the write traffic amount generated between each application and each edge communications device. The processing next proceeds to an OP65.

The processing from the OP65 through an OP68 is executed for all communications devices in the communication system. At the OP65, the processor 101 determines whether or not the load for the current communications device under investigation is at or below the threshold. When the load for the current communications device under investigation is at or below the threshold (Yes in OP65), the processing proceeds to an OP66. When the load for the current communications device under investigation is over the threshold (No in OP65), the processing switches to the next communications device, or the processing proceeds to an OP69. The processing proceeds to the OP69 when the processing from the OP65 through the OP68 has completed for all communications devices.

At the OP66, the processor 101 designates the current communications device under investigation as the candidate communications device to store the data D1. At an OP67, the processor 101 calculates the read traffic amount and the write traffic amount generated between each edge communications device and the storage communications device, and calculates the total amounts for both. At the OP68, the processor 101 calculates the total traffic amount generated on the network as the sum of the total read traffic amount and the total write traffic amount. Afterwards, the processing switches to the next communications device, or proceeds to the OP69.

At the OP69, the processor 101 determines the communications device as the communications device with the smallest total traffic amount. Afterwards, the processing illustrated in FIG. 36 terminates.

The processing at the OP63 corresponds to the processing by the read traffic amount calculating unit 21. The processing at the OP64 corresponds to the processing by the write traffic amount calculating unit 22. The processing at the OP61, OP62, and OP65 through OP67 related to the read traffic corresponds to the processing by the read traffic amount calculating unit 21. The processing at the OP61, OP62, and OP65 through OP67 related to the write traffic corresponds to the processing by the write traffic amount calculating unit 22. The processing at the OP68 corresponds to the processing by the total traffic amount calculating unit 23. The processing at the OP69 corresponds to the processing by the determining unit 3. Further, when there are no applications to send read requests or applications that send write requests present in the communication system 100, the processing related to either reads or writes is not performed when that type of application is not present.

Operational Advantages of the Sixth Embodiment

According to the sixth embodiment, the control device C1 filters candidate communications devices to store the data after considering the processing performance and the load state of each communications device. As a result, the occurrence of read request and write request failures due to the overloading of the communications device may be reduced. By reducing the occurrence of read request and write request failures, the retransmission of read requests and write requests may be reduced, for example, and the increase in traffic due to retransmission of read requests and write requests may be suppressed.

Therefore, according to the sixth embodiment, the occurrence of read request and write request failures are suppressed, and the communications device to store the data may be determined such that storage space is efficiently used throughout the entire communication system and the amount of traffic generated on the communication system is reduced.

Other

The technologies described regarding the first embodiment through the sixth embodiment may be executed as combinations. The processing by the control device C1 may be distributed over multiple computers regarding any embodiment from the first embodiment through the sixth embodiment. For example, the recording unit 1, difference calculating unit 2, and determining unit 3 in the control device C1 may each be executed on separate computers. The control device C1 determining the storage location may be a different computer depending on the data type.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device coupled to a network system including a plurality of processing devices, the plurality of processing devices communicating to other processing devices through a plurality of links, a plurality of applications being executed by the plurality of processing devices, the information processing device comprising:

a memory configured to store first information related to accesses to data by the plurality of processing devices executing the plurality of applications, and second information related to a network configuration of the network system; and a processor configured to execute a plurality of first determinations, each of the plurality of first determinations determining a plurality of access delays to the data from each of the plurality of processing devices executing the plurality of applications, each one of the plurality of first determinations being executed under a condition that each one of the plurality of processing devices stores the data, respectively, exclude, based on the plurality of first determinations, a processing device included in the plurality of processing devices from being a candidate device to store the data when any one of the plurality of access delays is over a threshold value in each of the plurality of first determinations, generate a copied data of the data when all of the plurality of processing devices are excluded as the candidate device to store the data, execute a plurality of second determinations of traffic amounts in the network system caused by accessing of the data and the copied data by the plurality of processing devices executing the plurality of applications, each of the plurality of second determinations being executed under a condition that any two processing devices of the plurality of processing devices store the data and the copied data respectively, and that the plurality of processing devices accessing any one of the data and the copied data stored in the two processing devices respectively in executing the plurality of applications, and the plurality of second determinations being executed based on the first information and a number of links between a processing device among the plurality of processing devices which stores any one of the data and the copied data and a processing device among the plurality of processing devices which execute the plurality of applications, respectively, the number of the links being determined based on the second information, and determine a first processing device and a second processing device among the plurality of processing devices as the candidate device to store the data and the copied data, respectively, to be accessed by the plurality of processing devices executing the plurality of applications based on the determined traffic amounts, wherein the processor is further configured to execute a first calculation to calculate the traffic amounts as a sum of a plurality of first traffic data caused by the plurality of processing devices executing the plurality of applications, the first calculation is executed under a condition that a first pair of processing devices included in the plurality of processing devices store the data and the copied data respectively, execute a second calculation to calculate the traffic amounts as a sum of a plurality of second traffic data caused by the plurality of processing devices executing the plurality of applications, the second calculation is executed under a condition that a second pair of processing devices included in the plurality of processing devices store the data and the copied data respectively, and determine the first pair of the processing device to store the data and the copied data when the sum of the first traffic data is less than the sum of the second traffic data, wherein the processor determines the first pair of the processing device to store the data and the copied data so as to manage an amount of traffic generated to store the data and the copied data throughout the network system.

2. The information processing device according to claim 1, wherein the first information includes an average number of time of accessing per a certain time period and an average data size per access, and wherein the processor is configured to:
in the first calculation, calculate a first traffic amount included in the plurality of first traffic data by multiplying the average number of time of accessing and the average data size per access and the number of the links.

3. The information processing device according to claim 1, wherein the memory is configured to store a storage usage ratio corresponding to the plurality of processing devices, and wherein the processor is configured not to determine a third processing device included in the plurality of the processing devices as the candidate device to store the data where a storage usage ratio of the third processing device is over a certain threshold.

4. The information processing device according to claim 1, wherein the memory is configured to store a load corresponding to the plurality of processing devices, and wherein the processor is configured not to determine a third processing device included in the plurality of the processing devices as the candidate device to store the data where a load of the third processing device is over a certain threshold.

5. The information processing device according to claim 1, wherein the first information is related to data reads by the plurality of processing devices executing the plurality of applications.

6. The information processing device according to claim 5, wherein the first information related to the data reads by the plurality of processing devices executing the plurality of applications includes an average reads per unit of time and an average data size per read request.

7. The information processing device according to claim 1, wherein the first information is related to data writes by the plurality of processing devices executing the plurality of applications.

8. The information processing device according to claim 7, wherein the first information related to the data writes by the plurality of processing devices executing the plurality of applications includes an average writes per unit of time and an average data size per write request.

9. The information processing device according to claim 1, wherein the processor is configured to determine the first pair of the processing device among the plurality of processing devices as the candidate device where the amount of traffic generated traffic amounts becomes less when the first pair of the processing device store the data and the copied data than when another pair of the processing devices among the plurality of processing devices store the data and the copied data.

10. An information processing method using a network system including a plurality of processing devices communicating to other processing devices through a plurality of links, a plurality of applications being executed by the plurality of processing devices, the method comprising:

executing a plurality of first determinations, each of the plurality of first determinations determining a plurality of access delays to data from each of the plurality of processing devices executing the plurality of applications, each one of the plurality of first determinations being executed under a condition that each one of the plurality of processing devices stores the data, respectively;

excluding, based on the plurality of first determinations, a processing device included in the plurality of processing devices from a candidate device to store the data, when any one of the plurality of access delays is over a threshold value in each of the plurality of first determinations;

generating a copied data of the data, when all of the plurality of processing devices are excluded from the candidate device to store the data;

executing a plurality of second determinations of traffic amounts in the network system caused by accessing of the data and the copied data by the plurality of processing devices executing by the plurality of applications, the plurality of second determinations being executed under a condition that any two processing devices of the plurality of processing devices stores the data and the copied data respectively, and that the plurality of processing devices accessing any one of the data and the copied data stored in the two processing devices respectively in executing the plurality of applications, and the plurality of second determinations being executed based on first information and a number of links between a processing device among the plurality of processing devices which stores any of the data and the copied data and a processing device among the plurality of processing devices which execute the plurality of applications, the first information being related to accesses to the data by the plurality of processing devices executing of the plurality of applications respectively, and the number of the links being determined based on the second information that is related to a network configuration of the network system; and determining a first processing device and a second processing device among the plurality of processing devices as the candidate device to store the data and the copied data, respectively, to be accessed by the plurality of processing devices executing the plurality of applications based on the determined traffic amounts, wherein the information processing method further includes:
executing a first calculation to calculate the traffic amounts as a sum of a plurality of first traffic data caused by the plurality of processing devices executing the plurality of applications, the first calculation is executed under a condition that a first pair of processing devices included in the plurality of processing devices store the data and the copied data respectively, executing a second calculation to calculate the traffic amounts as a sum of a plurality of second traffic data caused by the plurality of processing devices executing the plurality of applications, the second calculation is executed under a condition that a second pair of processing devices included in the plurality of processing devices store the data and the copied data respectively, and determining the first pair of the processing device to store the data and the copied data when the sum of the first traffic data is less than the sum of the second traffic data, wherein the first pair of the processing device is determined to store the data and the copied data so as to manage an amount of traffic generated to store the data and the copied data throughout the network system.

11. A non-transitory computer-readable recording medium having a program stored therein for causing an information processing device to execute:

executing a plurality of first determinations, each of the plurality of first determinations determining a plurality of access delays to data from each of a plurality of processing devices of a network system executing a plurality of applications, each one of the plurality of first determinations being executed under a condition that each one of the plurality of processing devices stores the data, respectively;

excluding, based on the plurality of first determinations, a processing device included in the plurality of processing devices from a candidate device to store the data, when any one of the plurality of access delays is over a threshold value in each of the plurality of first determinations;

generating a copied data of the data when all of the plurality of processing devices are excluded from the candidate device to store the data;

executing a plurality of second determinations traffic amounts in the network system caused by accessing of the data and the copied data by the plurality of processing devices executing the plurality of applications, the plurality of processing devices communicating to other processing devices through a plurality of links, the plurality of applications being executed by the plurality of processing devices, the plurality of second determinations being executed under a condition that any two processing devices of the plurality of processing devices stores the data and the copied data respectively, and that the plurality of processing devices accessing any one of the data and the copied data stored in the two processing devices respectively in executing the plurality of applications, and the plurality of second determinations being executed based on first information and a number of links between a processing device among the plurality of processing devices which stores any one of the data and the copied data and a processing device among the plurality of processing devices which execute the plurality of applications respectively, the first information being related to accesses to the data by the plurality of processing devices executing the plurality of applications, and the number of links being determined based on the second information that is related to a network configuration of the network system; and determining a first processing device and a second processing device as the candidate device to store the data and the copied data to be accessed by the plurality of processing devices executing the plurality of applications based on the determined traffic amounts, among the plurality of processing devices, wherein the information processing device is further configured to:

execute a first calculation to calculate the traffic amounts as a sum of a plurality of first traffic data caused by the plurality of processing devices executing the plurality of applications, the first calculation is executed under a condition that a first pair of processing devices included in the plurality of processing devices store the data and the copied data respectively, execute a second calculation to calculate the traffic amounts as a sum of a plurality of second traffic data caused by the plurality of processing devices executing the plurality of applications, the second calculation is executed under a condition that a second pair of processing devices included in the plurality of processing devices store the data and the copied data respectively, and determine the first pair of the processing device to store the data and the copied data when the sum of the first traffic data is less than the sum of the second traffic data, wherein the information processing device determines the first pair of the processing device to store the data and the copied data so as to manage an amount of traffic generated to store the data and the copied data throughout the network system.

* * * * *